(12) United States Patent
Li et al.

(10) Patent No.: US 12,036,632 B2
(45) Date of Patent: Jul. 16, 2024

(54) MULTI-STATION TURNING TOOL BIT MILLING FIXTURE SYSTEM

(71) Applicants: QINGDAO UNIVERSITY OF TECHNOLOGY, Shandong (CN); NINGBO SANHAN ALLOY MATERIAL CO., LTD., Zhejiang (CN)

(72) Inventors: Changhe Li, Qingdao (CN); Haogang Li, Qingdao (CN); Liang Luo, Qingdao (CN); Huajun Cao, Qingdao (CN); Bingheng Lu, Qingdao (CN); Lizhi Tang, Qingdao (CN); Yanbin Zhang, Qingdao (CN); Haizhou Xu, Qingdao (CN); Min Yang, Qingdao (CN); Huaping Hong, Qingdao (CN); Shuo Yin, Qingdao (CN); Xin Cui, Qingdao (CN); Mingzheng Liu, Qingdao (CN); Teng Gao, Qingdao (CN); Yali Hou, Qingdao (CN); Runze Li, Qingdao (CN)

(73) Assignees: QINGDAO UNIVERSITY OF TECHNOLOGY, Shandong (CN); NINGBO SANHAN ALLOY MATERIAL CO., LTD., Zhejiang (CN)

( * ) Notice: Subject to any disclaimer, the term of this patent is extended or adjusted under 35 U.S.C. 154(b) by 691 days.

(21) Appl. No.: 17/214,549

(22) PCT Filed: Feb. 6, 2020

(86) PCT No.: PCT/CN2020/074394
§ 371 (c)(1),
(2) Date: Mar. 26, 2021

(87) PCT Pub. No.: WO2021/114467
PCT Pub. Date: Jun. 17, 2021

(65) Prior Publication Data
US 2022/0347808 A1    Nov. 3, 2022

(30) Foreign Application Priority Data
Dec. 13, 2019   (CN) .......................... 201911282118.7

(51) Int. Cl.
*B23Q 3/06*    (2006.01)
*B23Q 3/08*    (2006.01)
(Continued)

(52) U.S. Cl.
CPC ............. *B23Q 3/061* (2013.01); *B23Q 3/082* (2013.01); *B23Q 11/10* (2013.01); *B23Q 17/005* (2013.01);
(Continued)

(58) Field of Classification Search
CPC ........ B23Q 3/061; B23Q 3/062; B23Q 3/082; B23Q 11/10; B23Q 17/002; B23Q 17/005;
(Continued)

(56) References Cited

U.S. PATENT DOCUMENTS

| | | | |
|---|---|---|---|
| 4,949,943 A | 8/1990 | Bernstein | |
| 2014/0138890 A1* | 5/2014 | Kawakami | B23Q 3/082 91/1 |

(Continued)

FOREIGN PATENT DOCUMENTS

| | | | | |
|---|---|---|---|---|
| CN | 103512525 A | | 1/2014 | |
| CN | 104227458 A | * | 12/2014 | ............. B23Q 3/061 |

(Continued)

OTHER PUBLICATIONS

Sep. 9, 2020 Search Report issued in Chinese Patent Application No. PCT/CN2020/074394.
(Continued)

*Primary Examiner* — Sunil K Singh
*Assistant Examiner* — Michael Vitale
(74) *Attorney, Agent, or Firm* — JCIPRNET

(57) ABSTRACT

A multi-station turning tool includes a lower bottom plate mechanism. A first hydraulic pipeline arranged in hydraulic fluid to an upper and an end face clamping hydraulic
(Continued)

cylinders; a supporting plate mechanism internally provided with an air-detection pipeline; a positioning mechanism includes a substrate and a plurality of supporting blocks; an upper clamping mechanism includes a V-shaped clamping block connected to an upper clamping big arm that's connected to the upper clamping hydraulic cylinder; an end face clamping mechanism includes an end face clamping block that's connected to an end face clamping big arm that's connected to the end face clamping hydraulic cylinder through a piston ejector rod; an end face clamping air-detection mechanism includes an air pressure detection component, connected to a controller, and is capable of detecting a pressure of the air-detection pipeline to identify working states of the positioning mechanism and the upper clamping mechanisms.

7 Claims, 35 Drawing Sheets

(51) Int. Cl.
    *B23Q 11/10*     (2006.01)
    *B23Q 17/00*     (2006.01)
    *B25B 5/12*     (2006.01)

(52) U.S. Cl.
    CPC ..... *B25B 5/122* (2013.01); *Y10T 409/304032* (2015.01)

(58) Field of Classification Search
    CPC ........... Y10T 409/303976; Y10T 409/304032; B23C 2270/08; B25B 5/003; B25B 5/12; B25B 5/122; B25B 5/125; B25B 11/02
    USPC ............. 409/135, 136; 269/25, 27, 311, 902
    See application file for complete search history.

(56) References Cited

U.S. PATENT DOCUMENTS

| | | | | |
|---|---|---|---|---|
| 2015/0145193 A1* | 5/2015 | Ogawa | ................ | B23Q 17/005 29/559 |
| 2016/0144471 A1* | 5/2016 | Tatsuda | ................... | B25B 11/02 269/13 |
| 2018/0051723 A1* | 2/2018 | Kojima | ................... | B23Q 3/069 |
| 2018/0354096 A1* | 12/2018 | Li | ........................... | B24B 55/02 |

FOREIGN PATENT DOCUMENTS

| | | | | |
|---|---|---|---|---|
| CN | 106002405 A | | 10/2016 | |
| CN | 207771368 U | * | 8/2018 | |
| CN | 208644750 U | | 3/2019 | |
| EP | 2093016 A1 | * | 8/2009 | .......... B23Q 17/005 |
| JP | 2005-210245 A | | 8/2005 | |

OTHER PUBLICATIONS

Sep. 9, 2020 Written Opinion issued in Chinese Patent Application No. PCT/CN2020/074394.

* cited by examiner

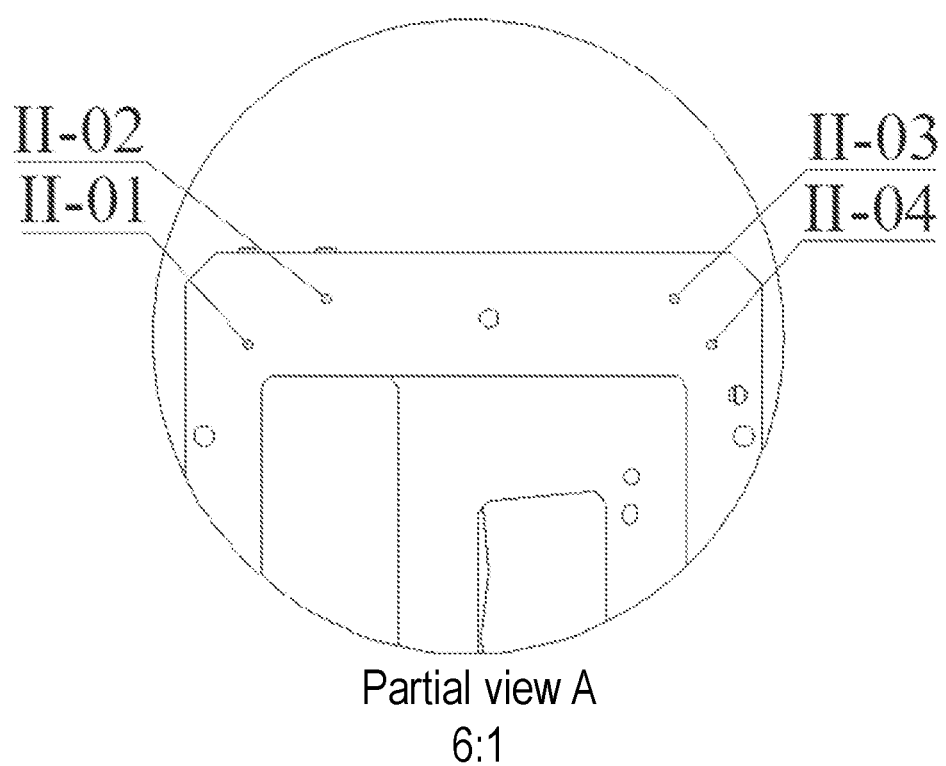
Partial view A
6:1
FIG. 3-(a)

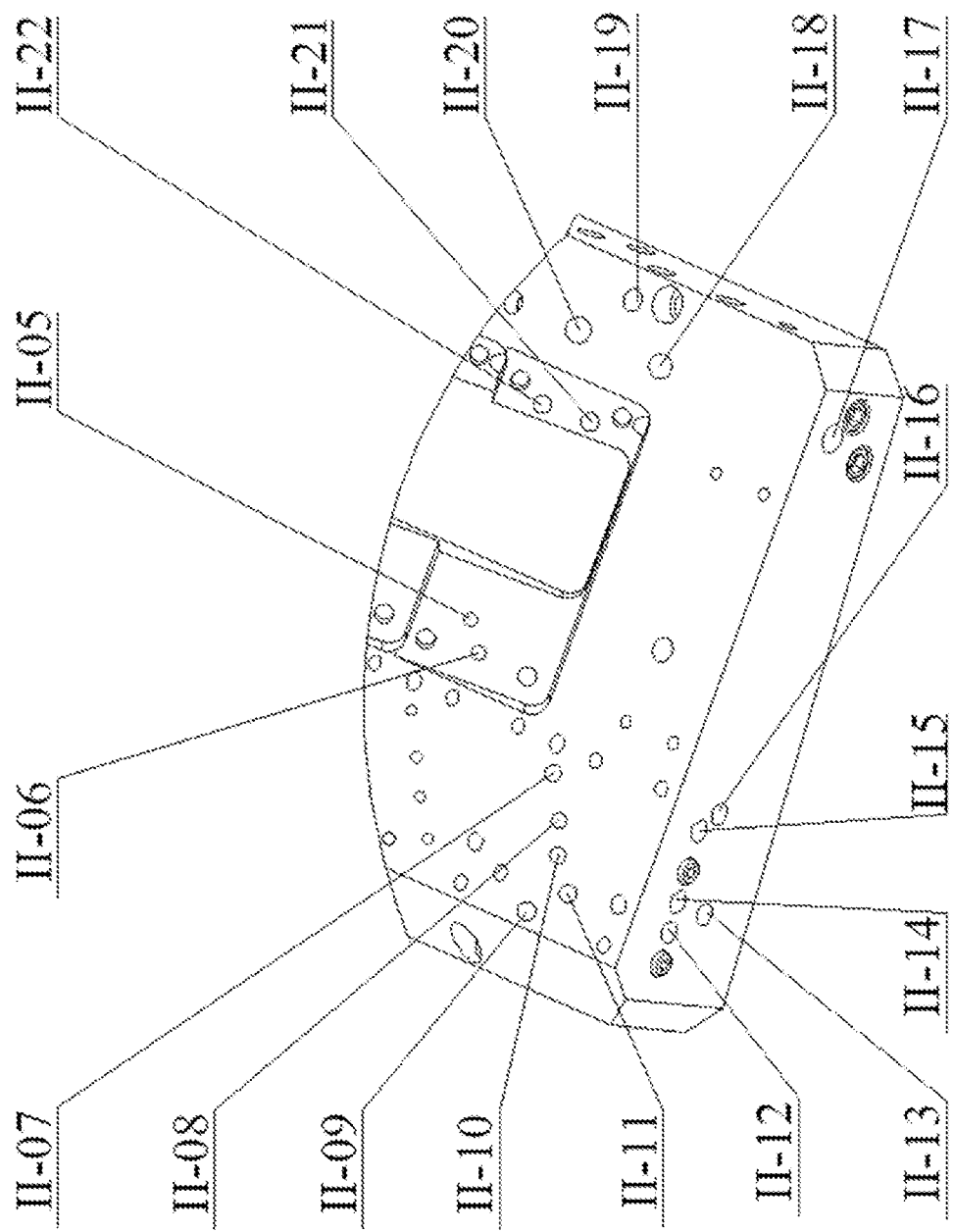
FIG. 4-(a)

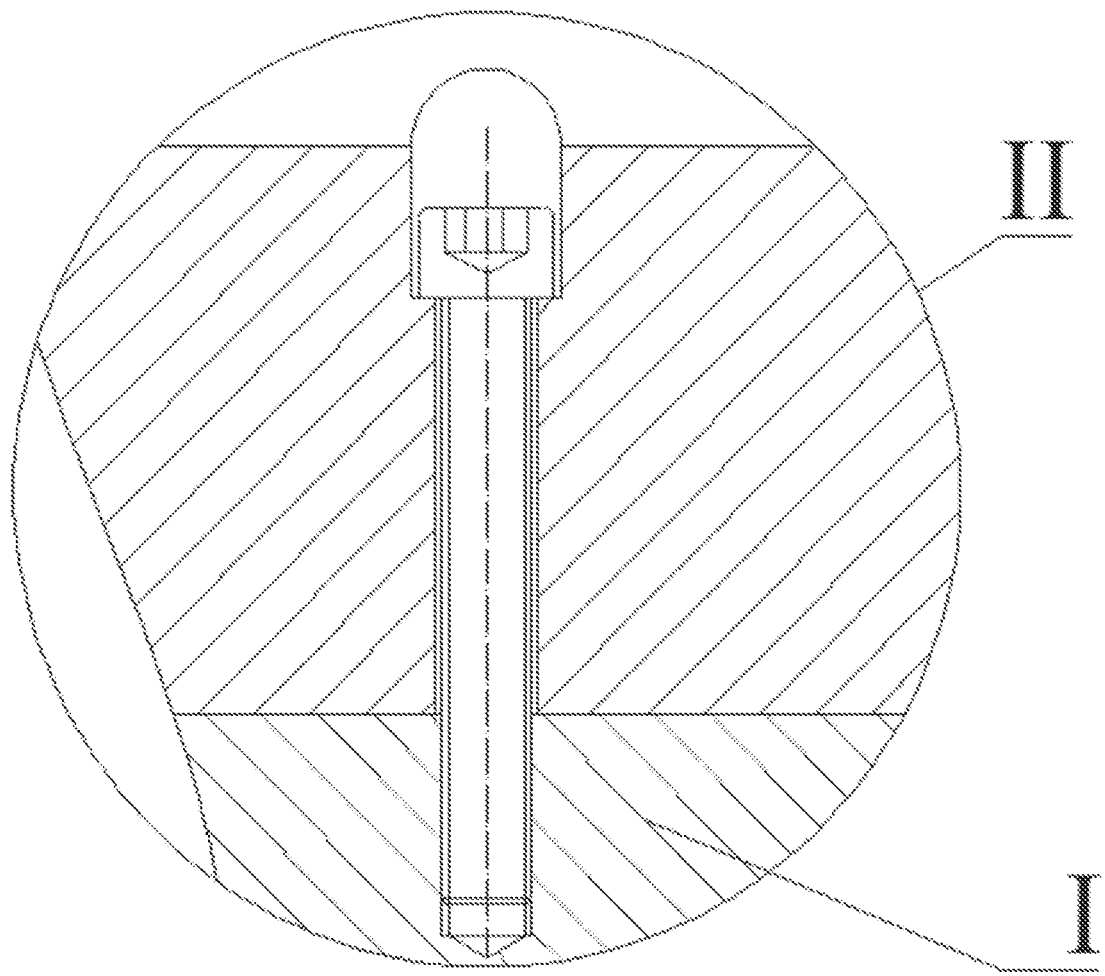
Partial view A
6:1
FIG. 5-(a)

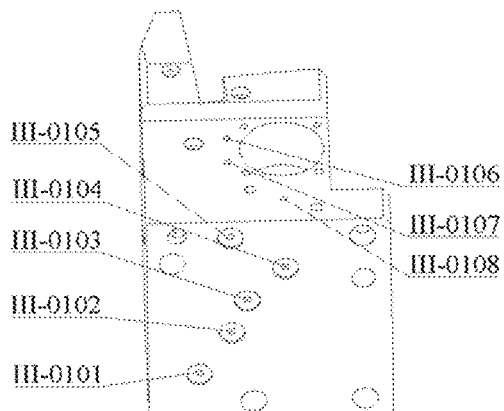
FIG. 7-(a)
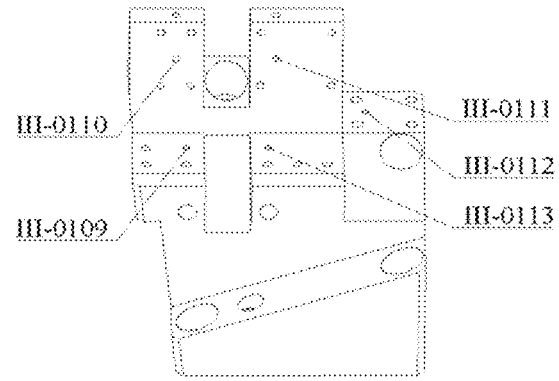
FIG. 7-(b)
FIG. 7-(c)
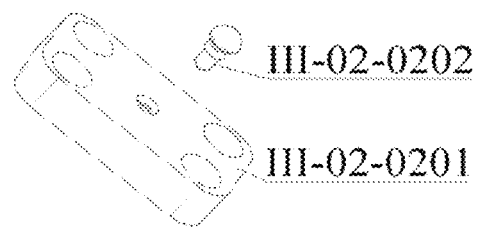
FIG. 7-(d)
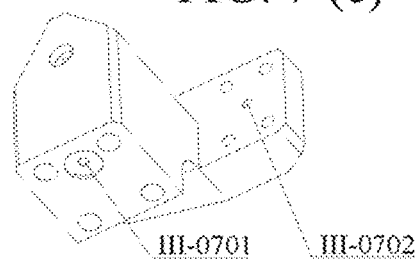
FIG. 7-(e)
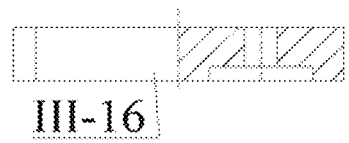
FIG. 7-(f)
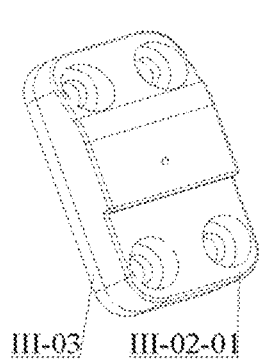
FIG. 8
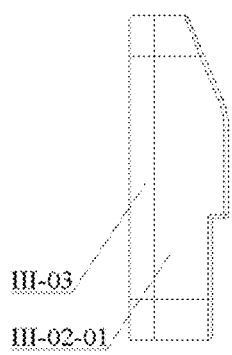
FIG. 8-(a)
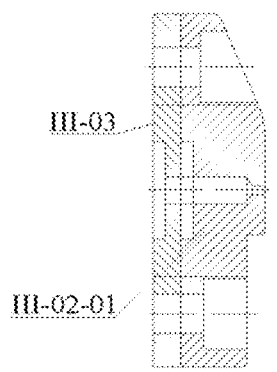
FIG. 8-(b)

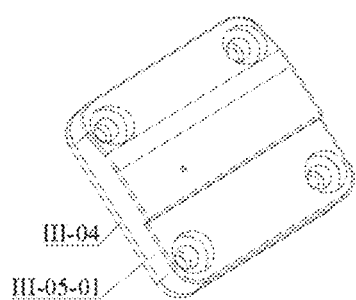 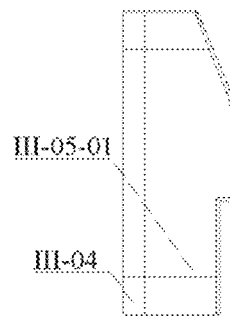 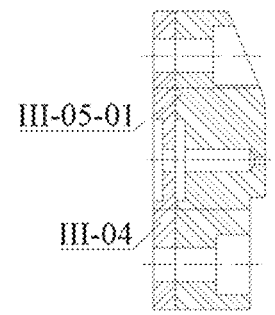
FIG. 9　　　　FIG. 9-(a)　　　　FIG. 9-(b)
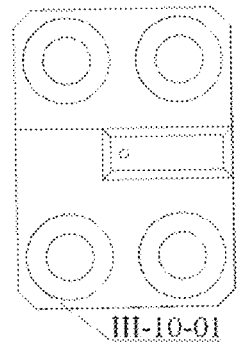 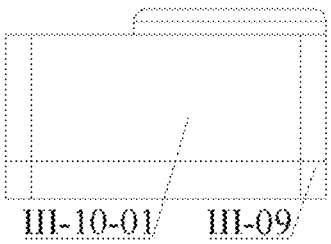 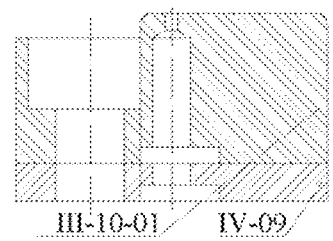
FIG. 10　　　　FIG. 10-(a)　　　　FIG. 10-(b)
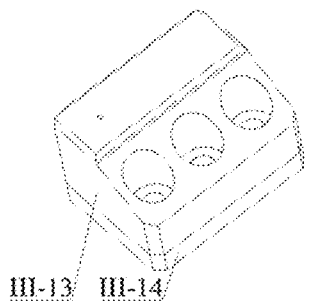 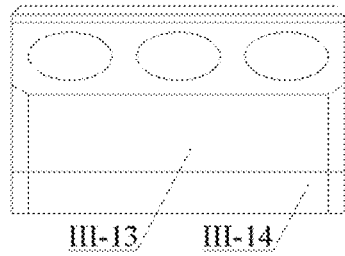 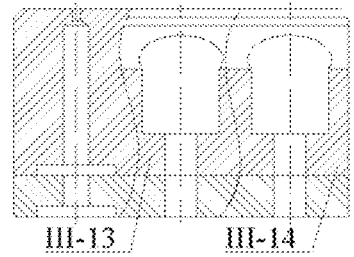
FIG. 11　　　　FIG. 11-(a)　　　　FIG. 11-(b)
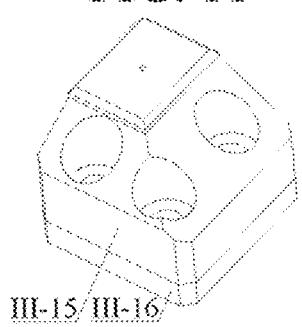 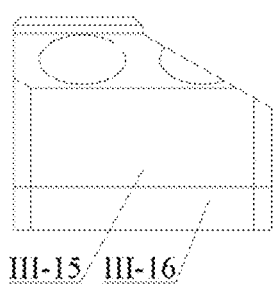 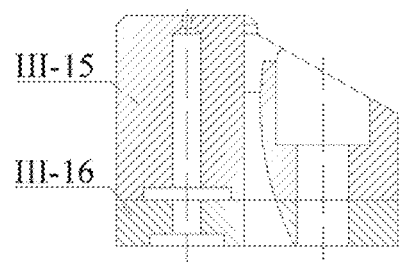
FIG. 12　　　　FIG. 12-(a)　　　　FIG. 12-(b)

FIG. 13-(a)

Partial view A
7:1

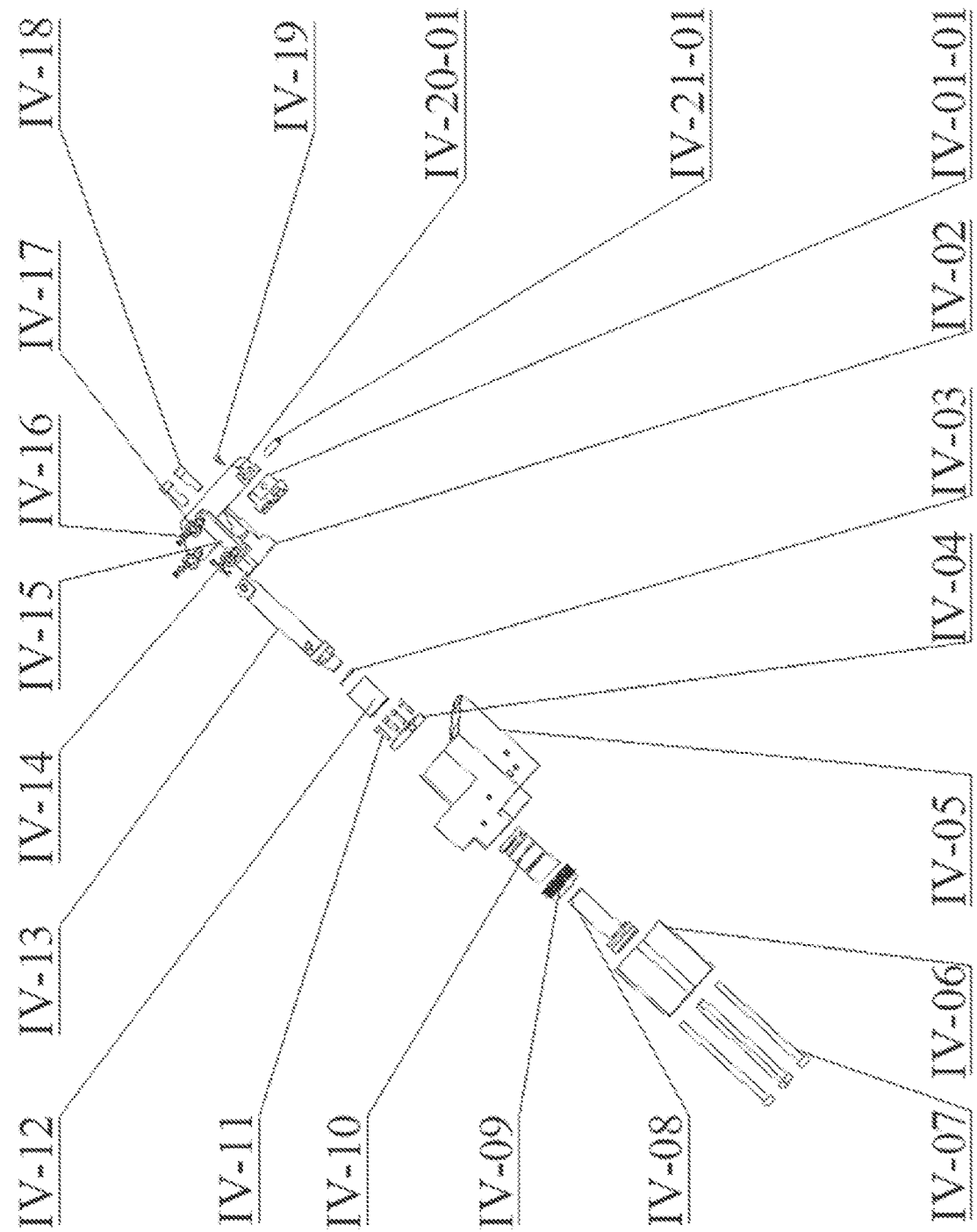
FIG. 14-(a)

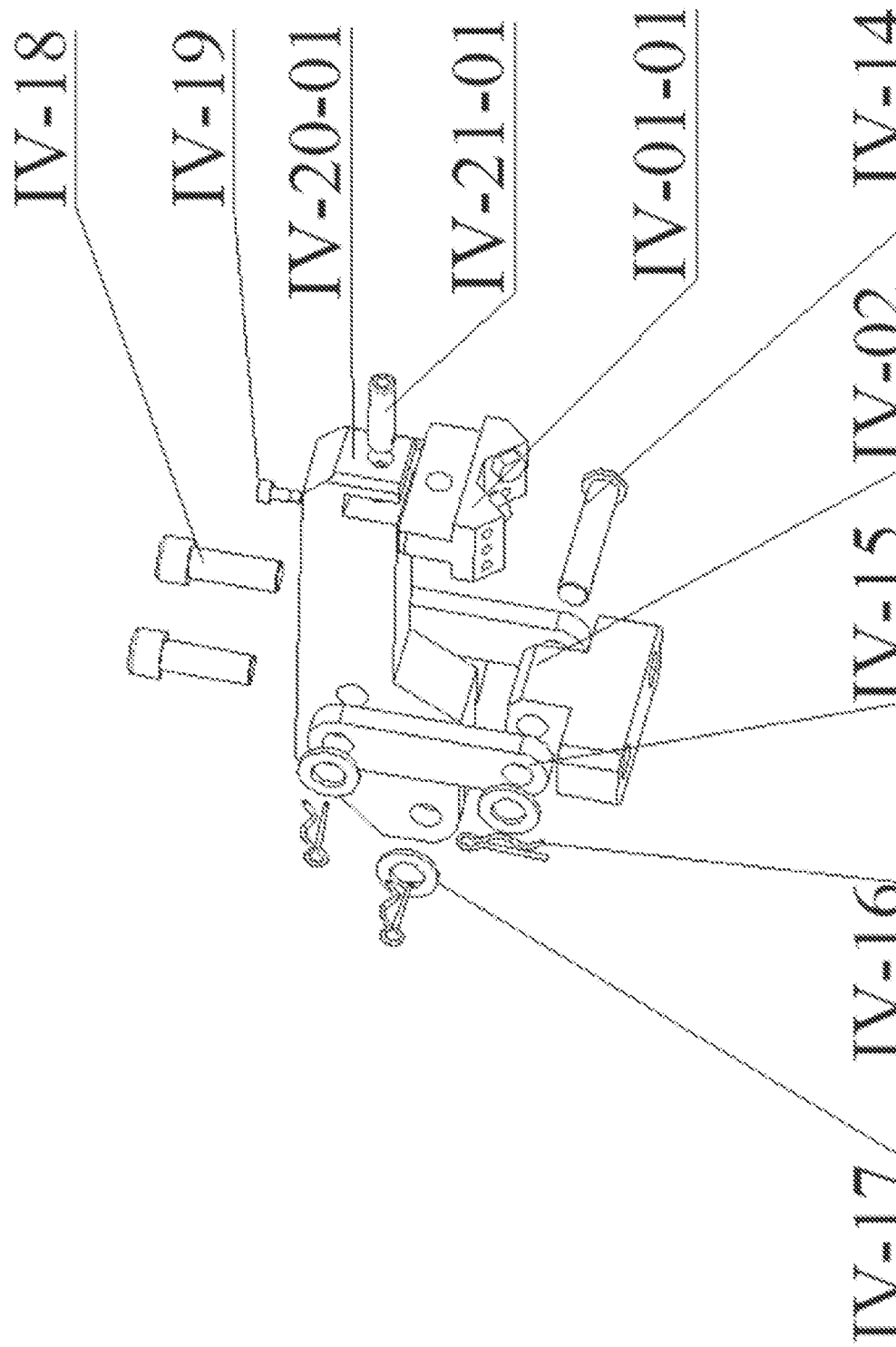
FIG. 14-(b)

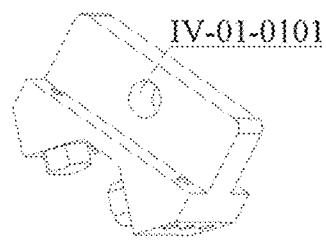
FIG. 14-(c)
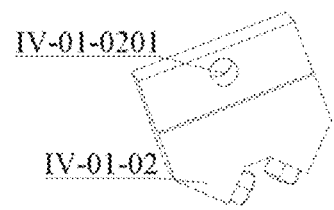
FIG. 14-(d)
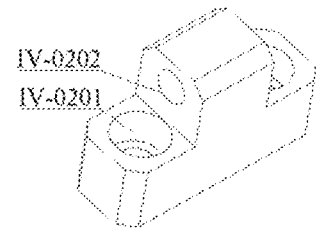
FIG. 14-(e)
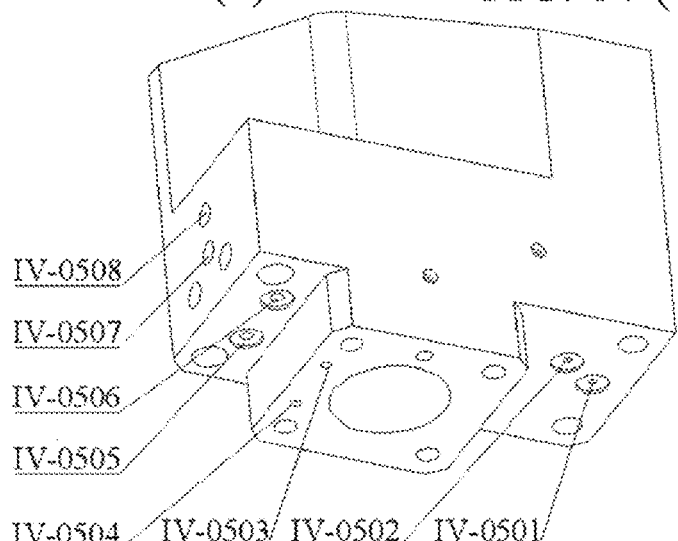
FIG. 14-(f)
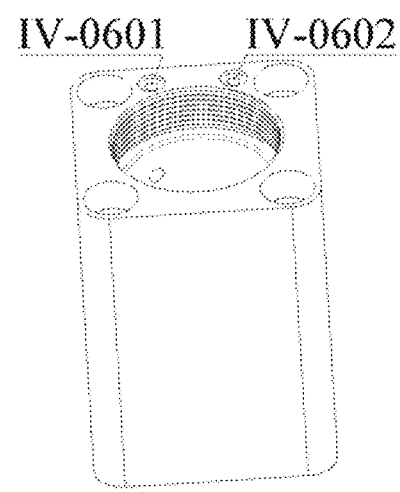
FIG. 14-(g)
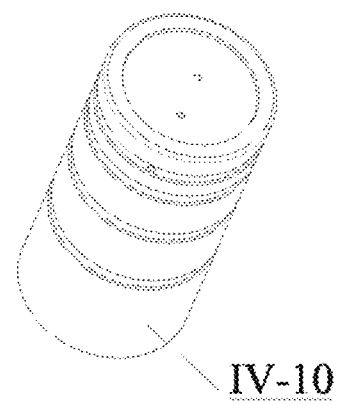
FIG. 15

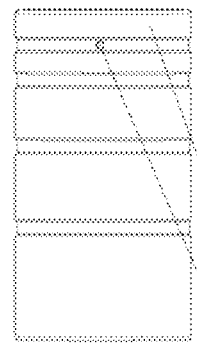
FIG. 15-(a)
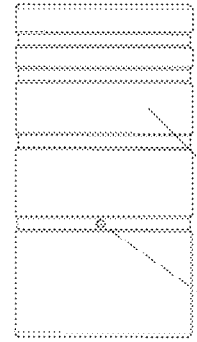
FIG. 15-(b)
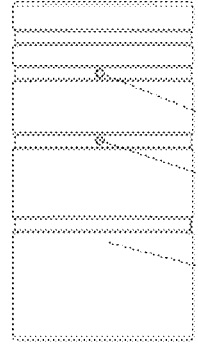
FIG. 15-(c)
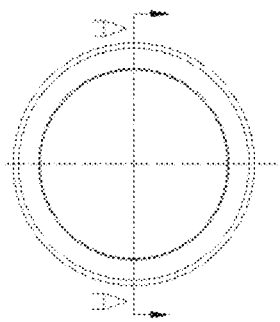
FIG. 15-(d)
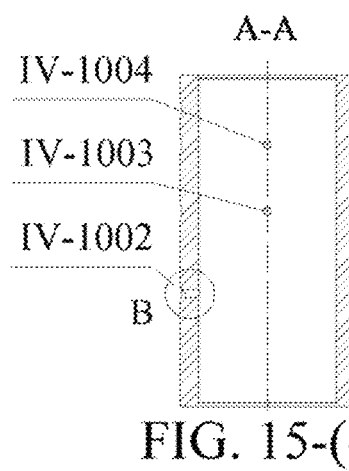
FIG. 15-(e)
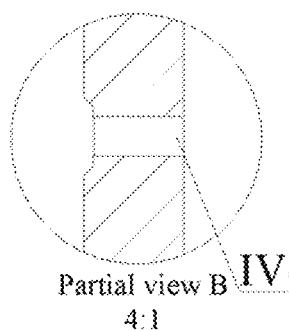
FIG. 15-(f)
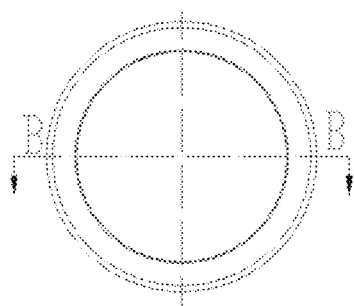
FIG. 15-(g)
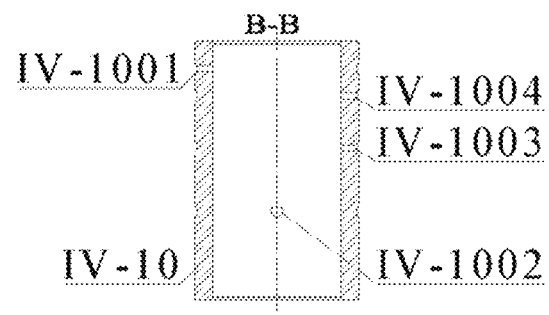
FIG. 15-(h)

FIG. 16
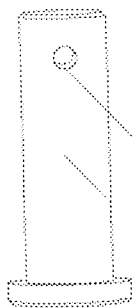
FIG. 17
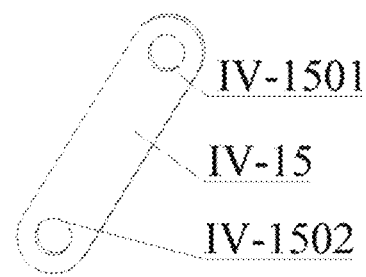
FIG. 18
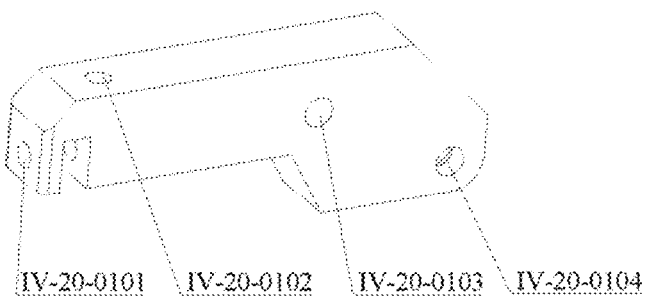
FIG. 19
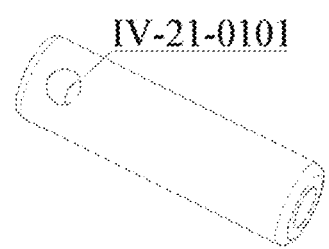
FIG. 20
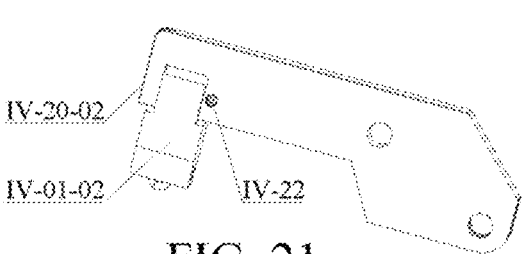
FIG. 21
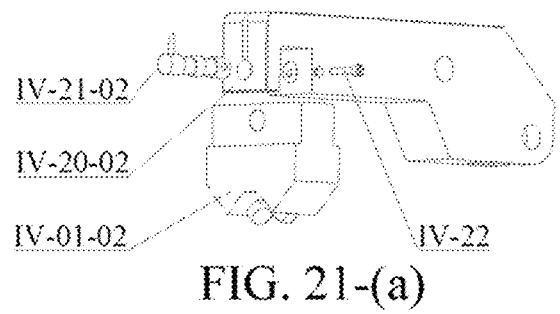
FIG. 21-(a)
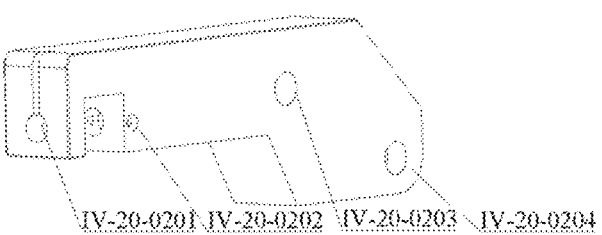
FIG. 21-(b)
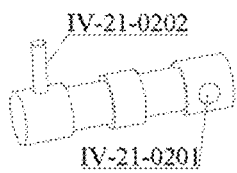
FIG. 21-(c)

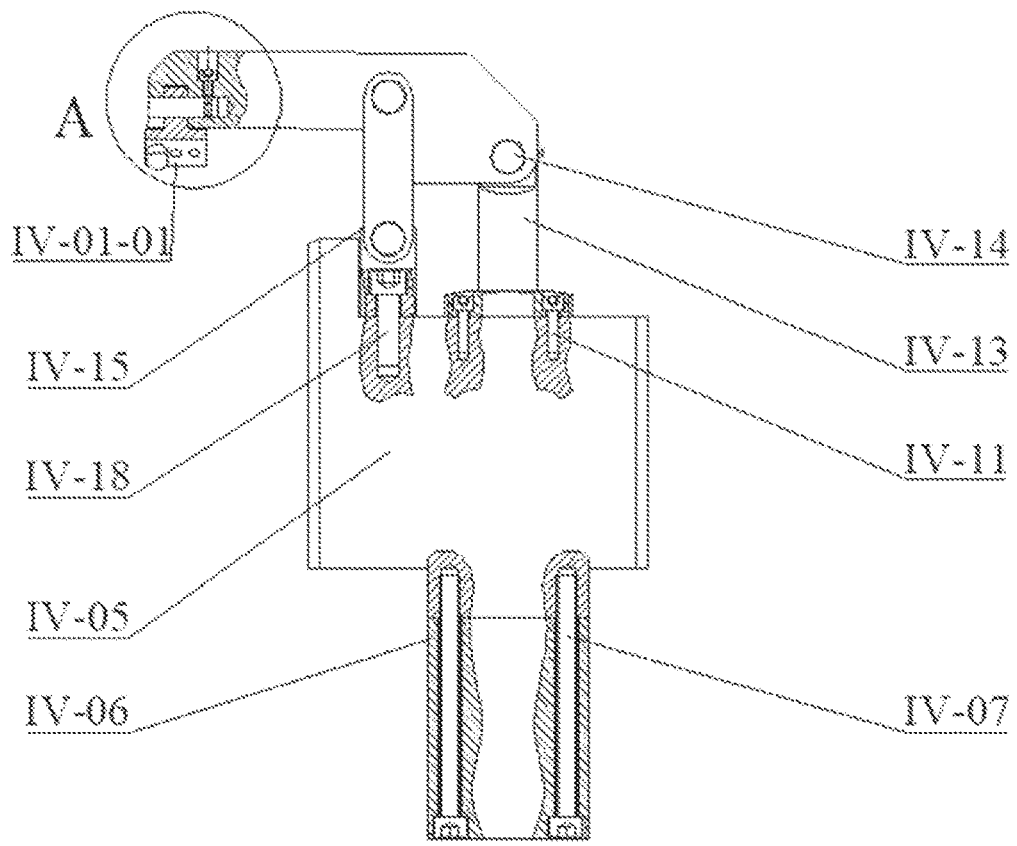
FIG. 22
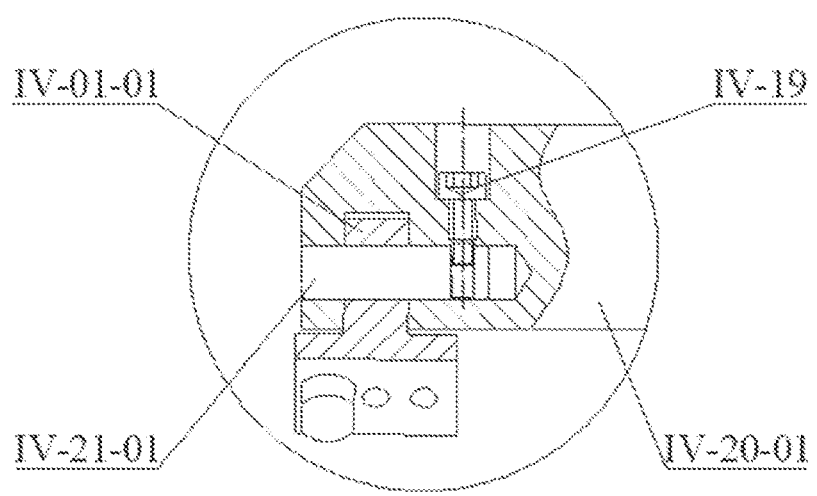
Partial view A
7:1
FIG. 22-(a)

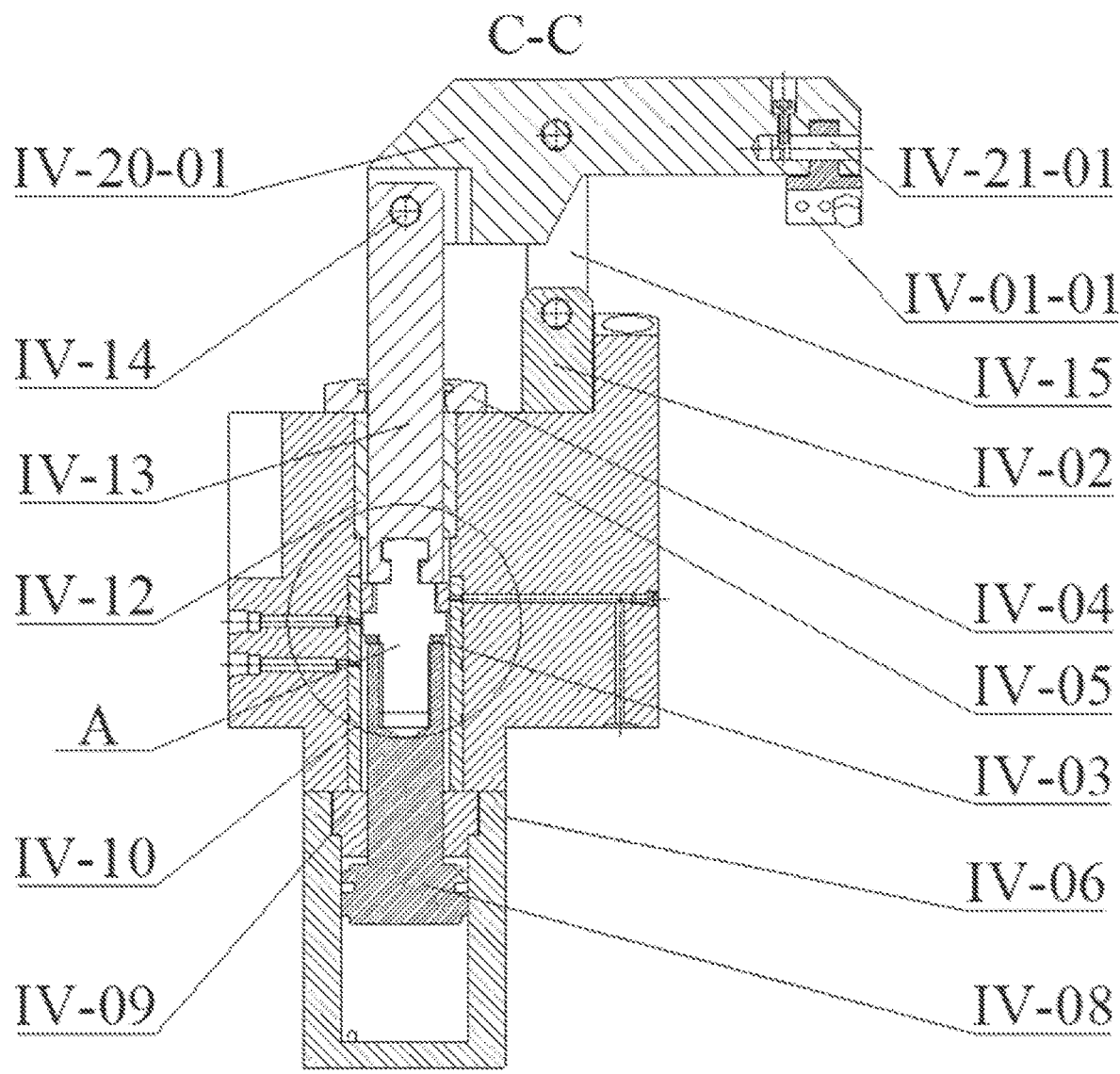
FIG. 23-(a)

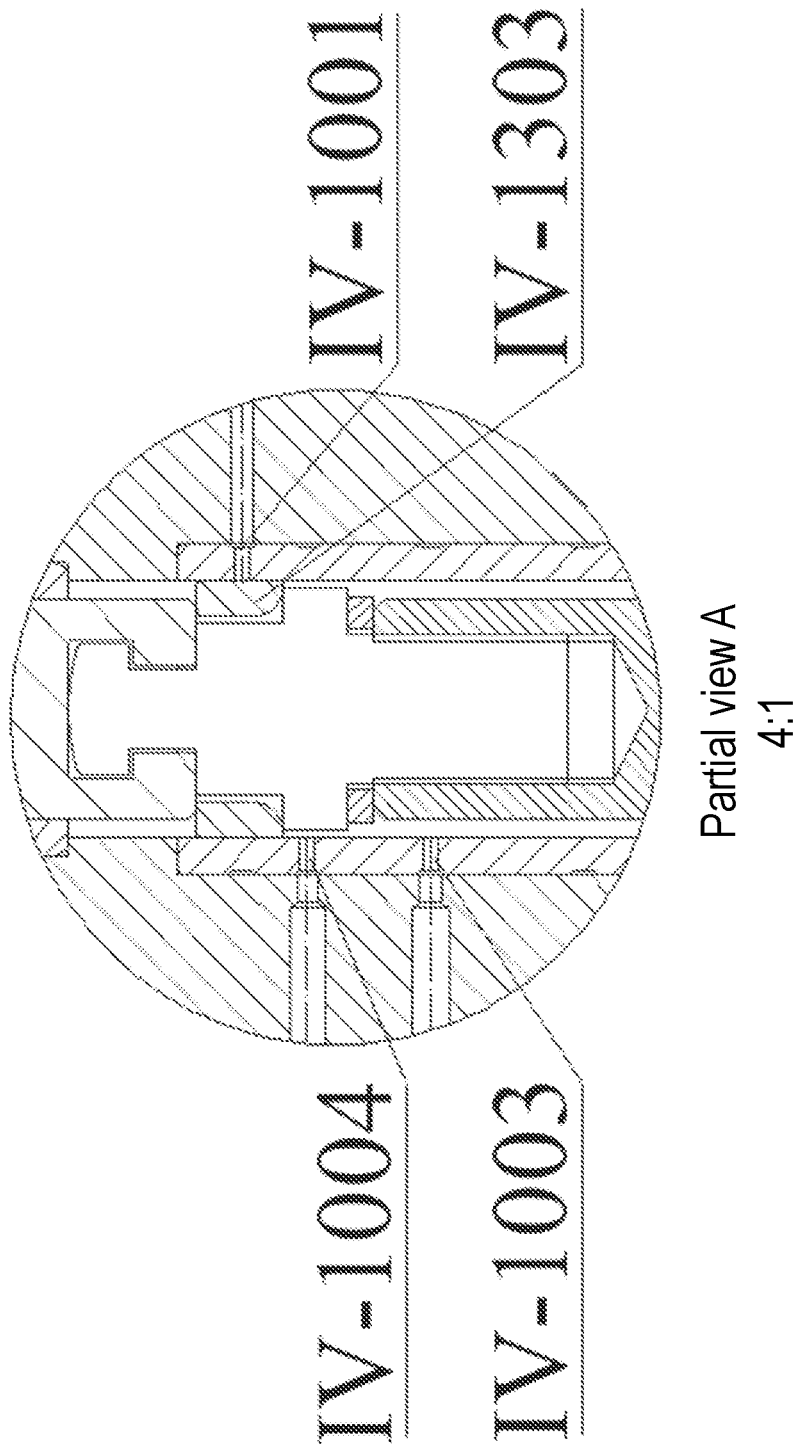
FIG. 23-(b)

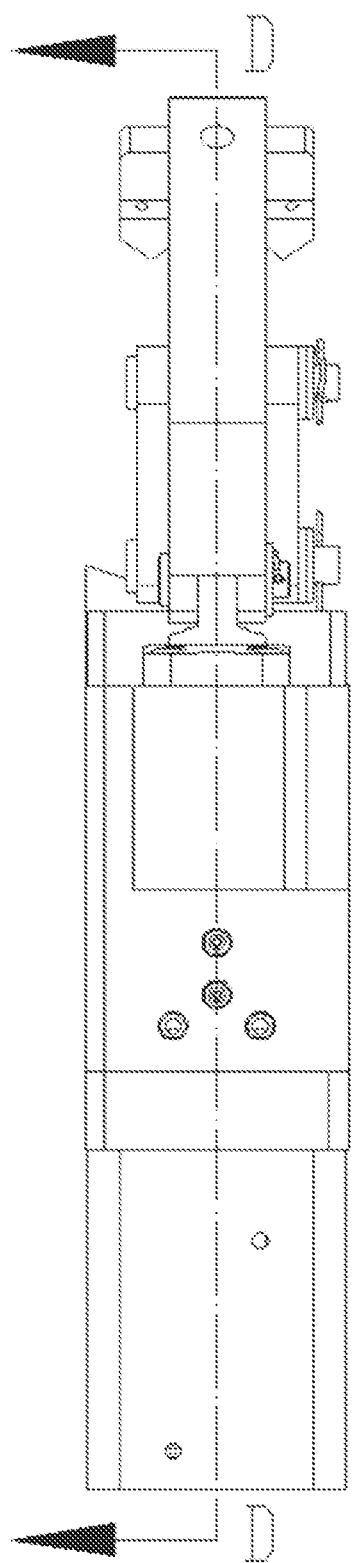
FIG. 23-(c)

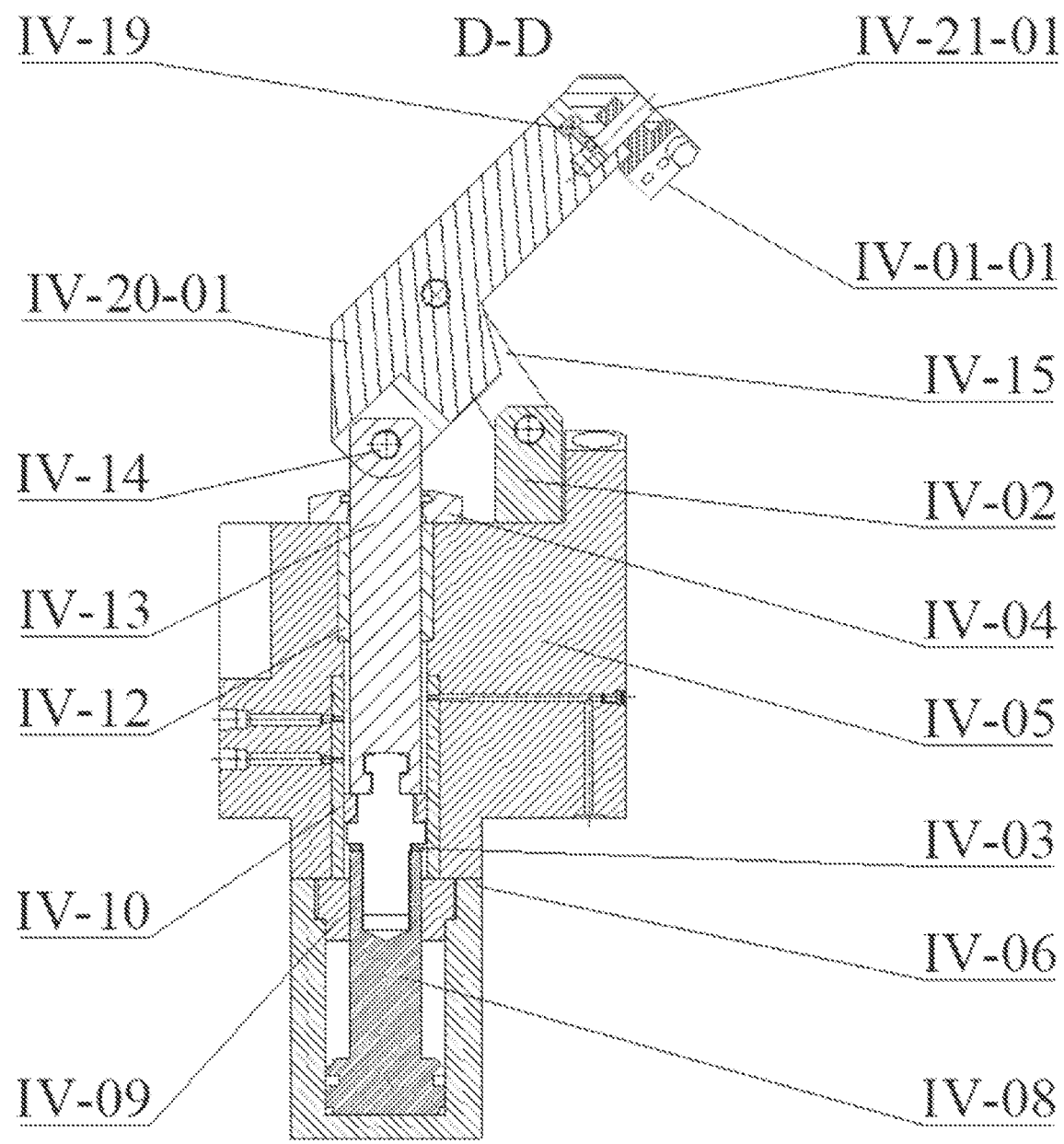
FIG. 23-(d)

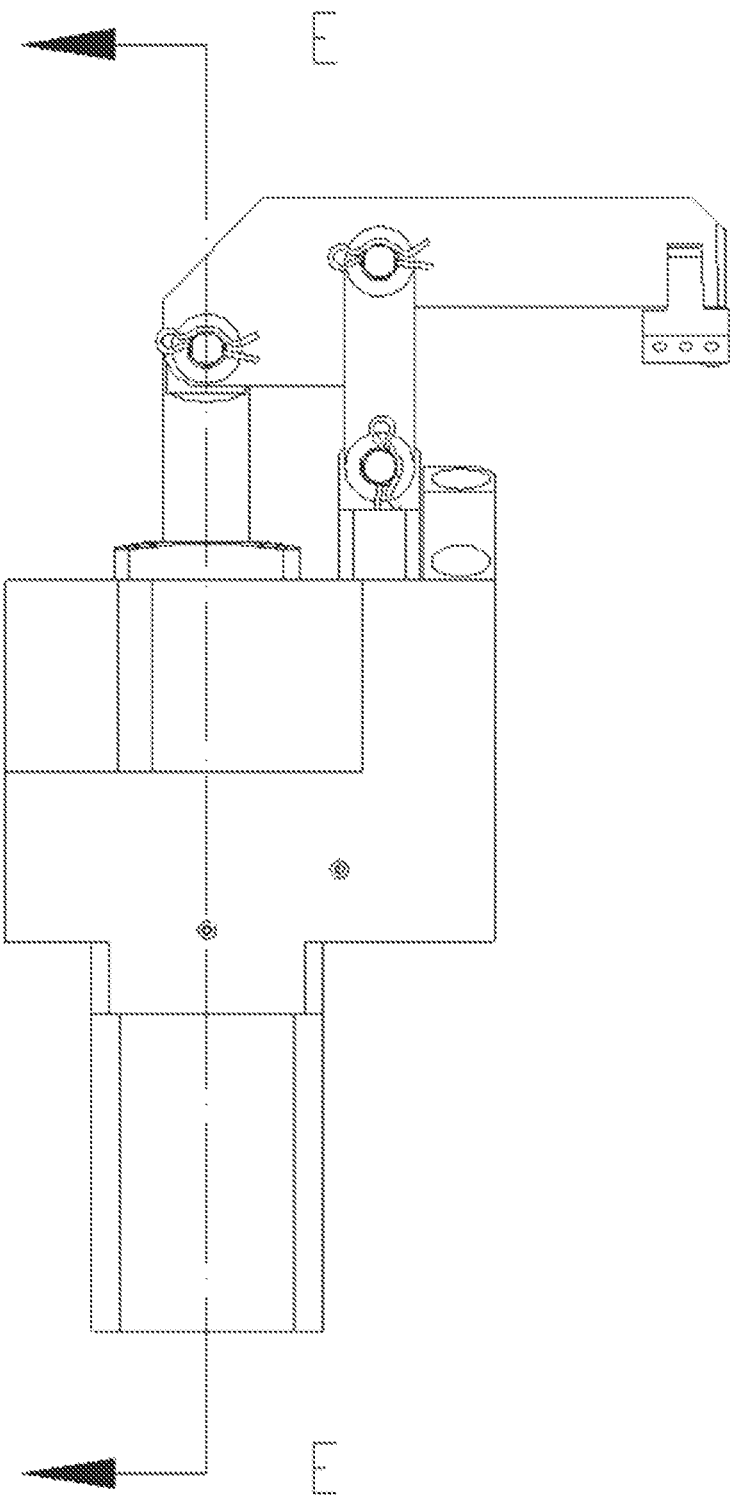
FIG. 23-(e)

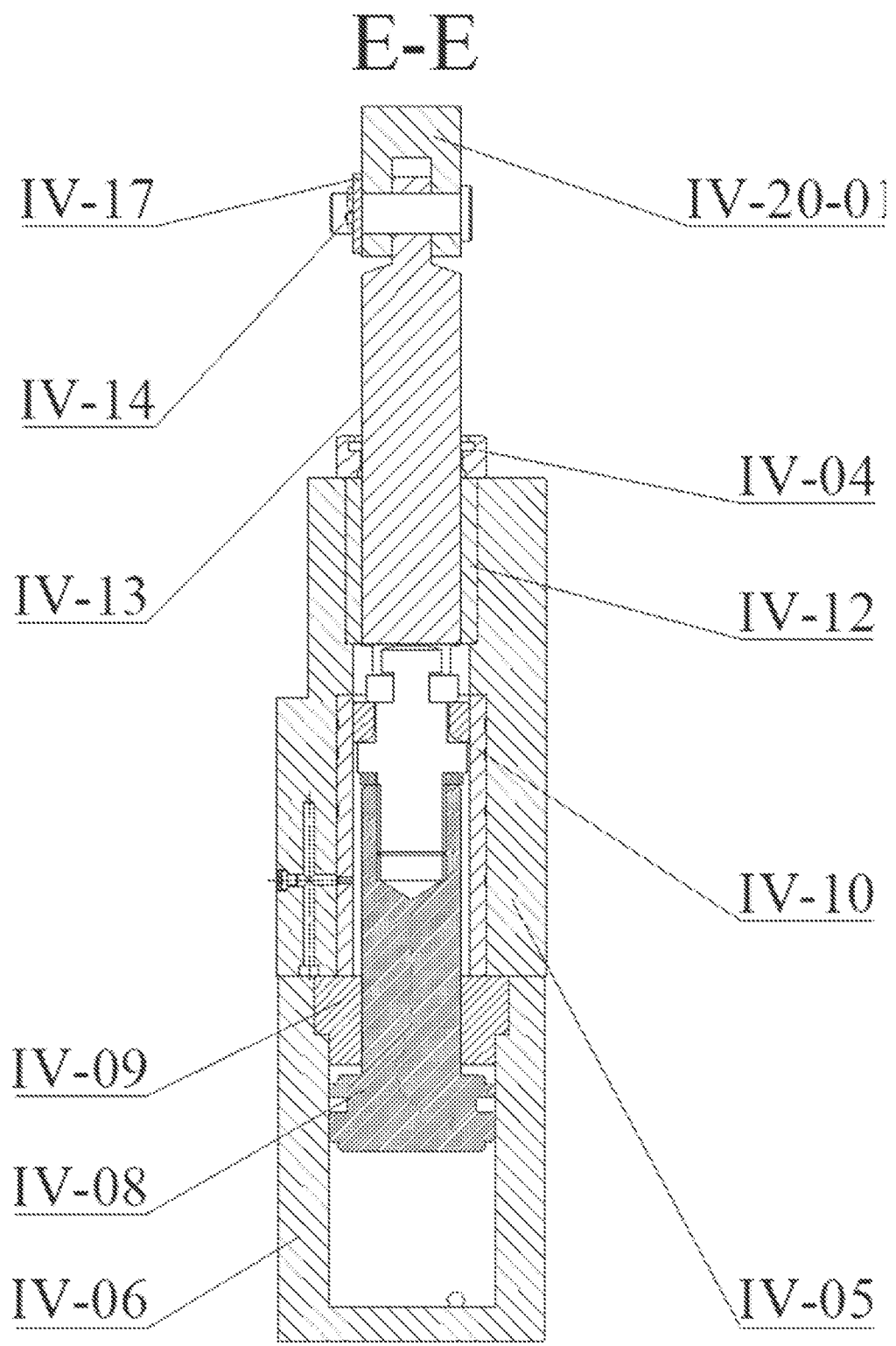
FIG. 23-(f)

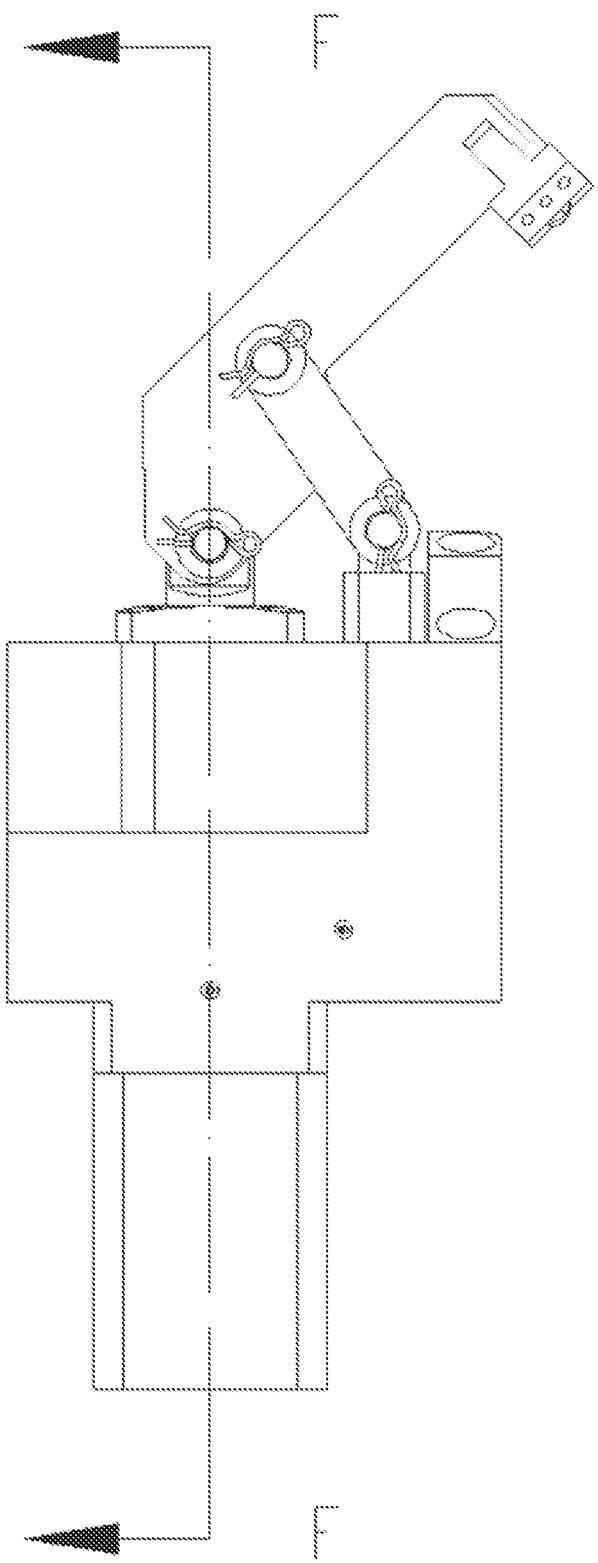
FIG. 23-(g)

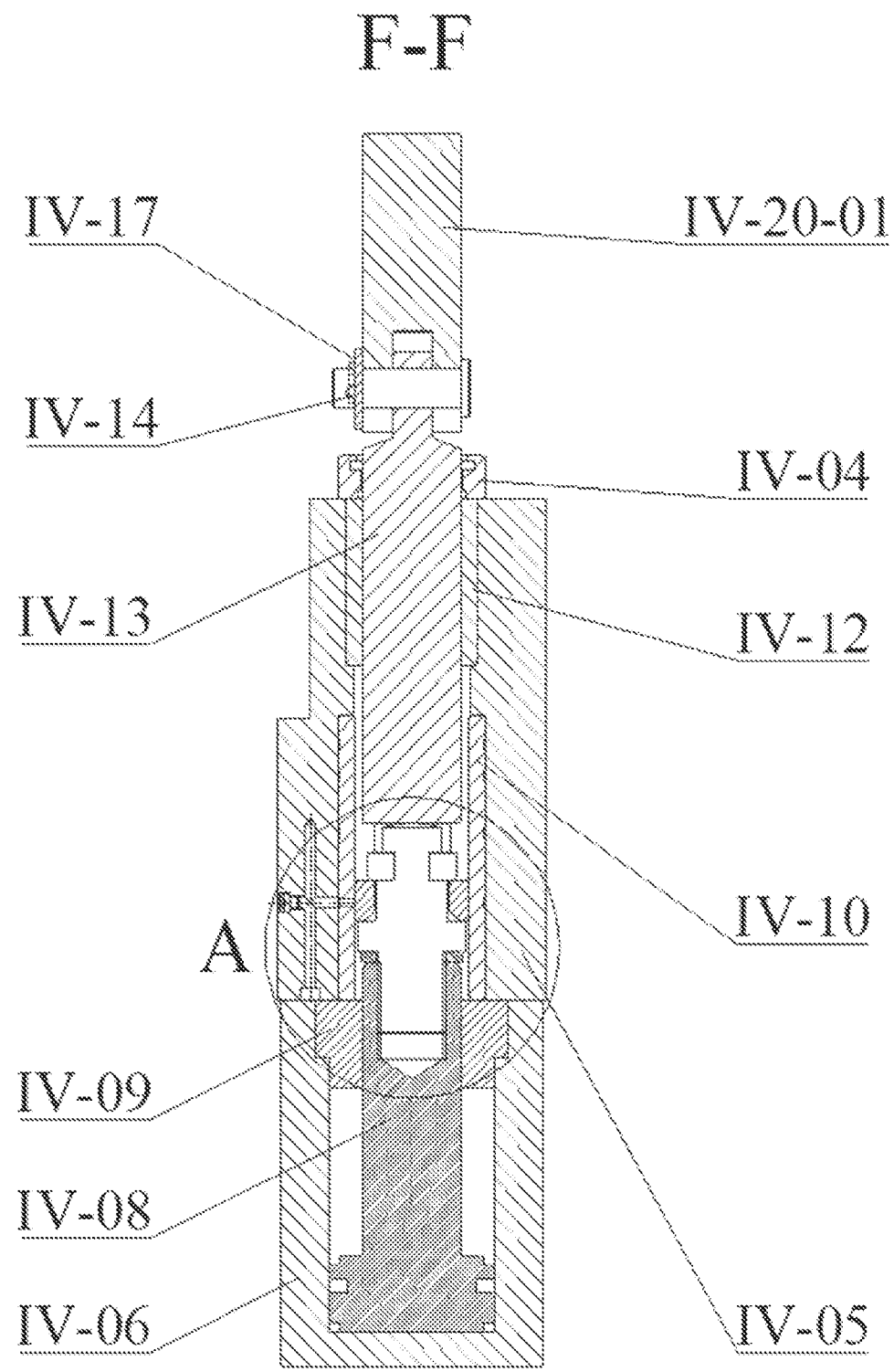
FIG. 23-(h)

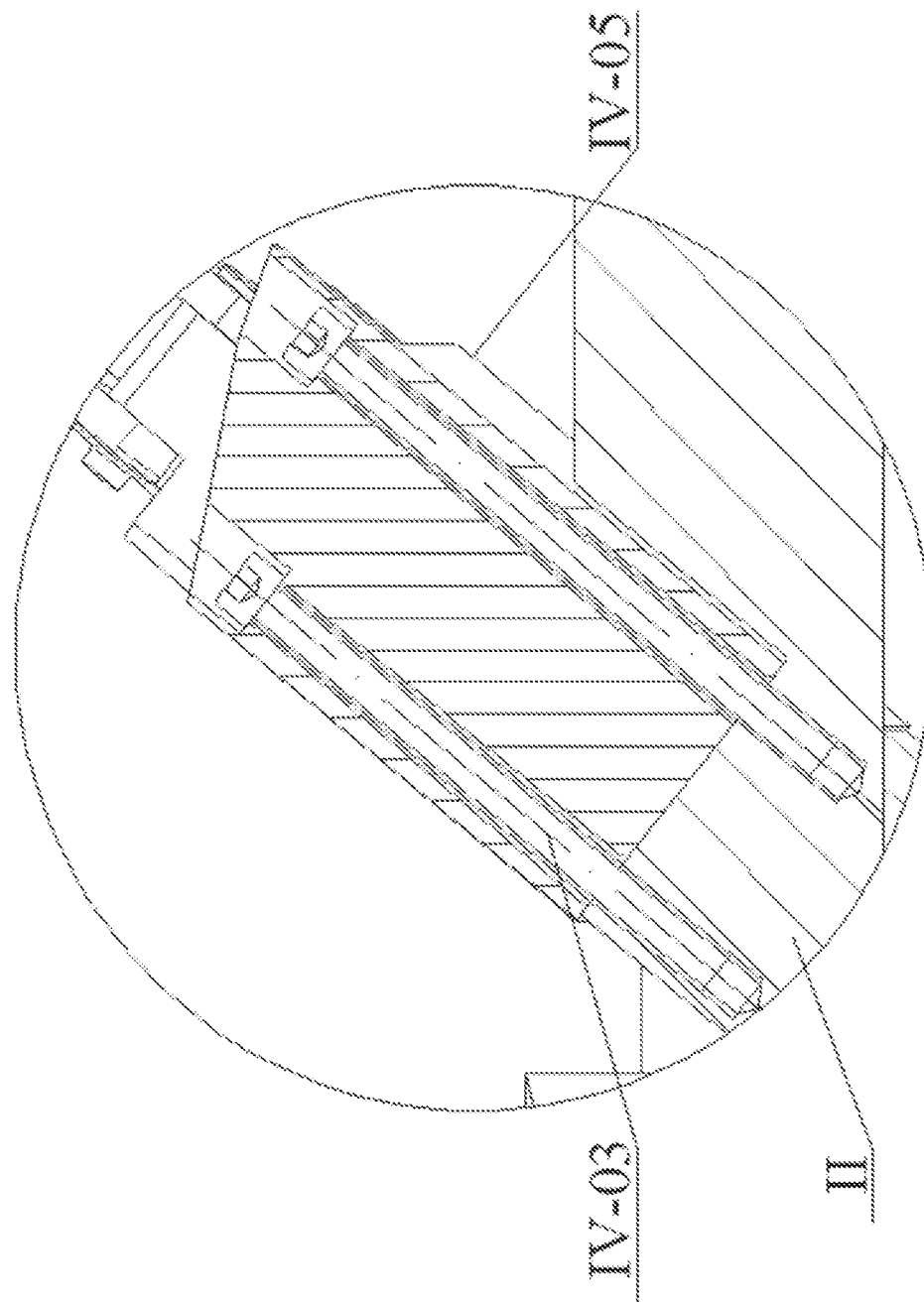
Partial view A
6:1
FIG. 24-(a)

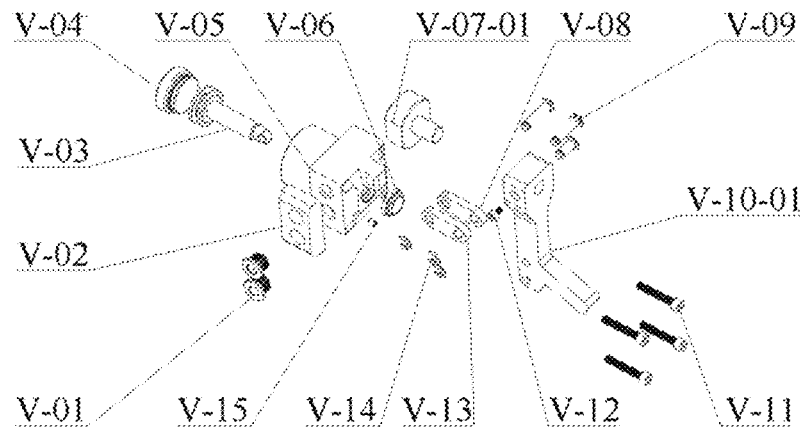
FIG. 25-(a)
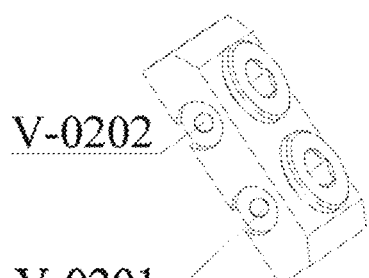
FIG. 25-(b)
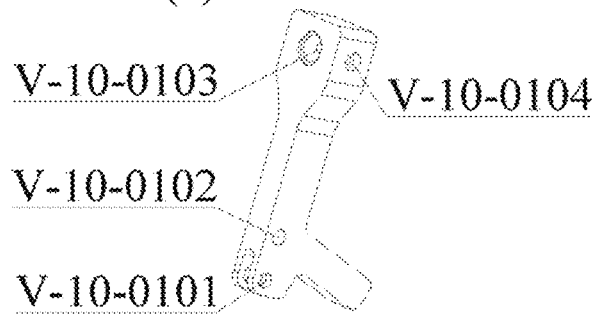
FIG. 25-(c)
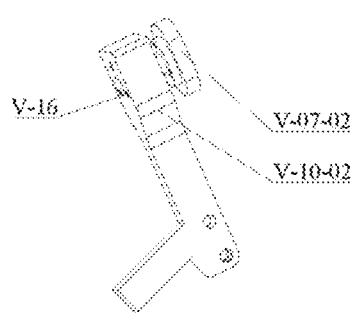
FIG. 26
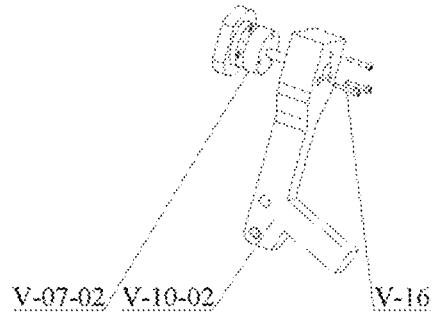
FIG. 26-(a)
FIG. 26-(b)
FIG. 26-(c)
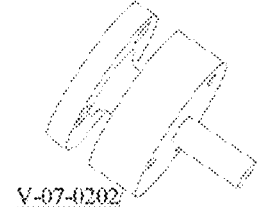
FIG. 26-(d)

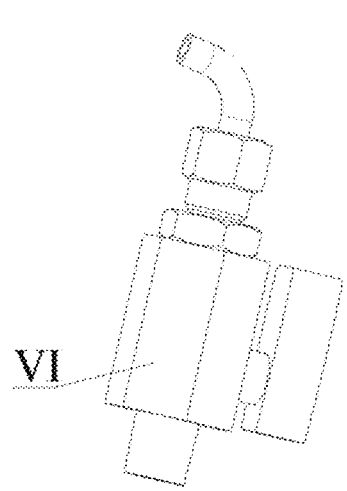
FIG. 27
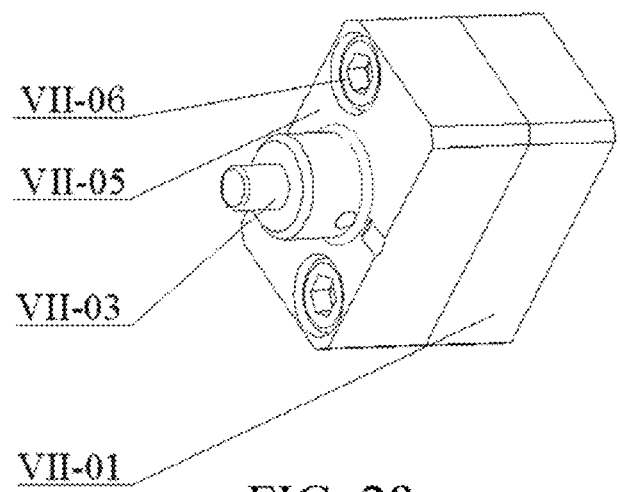
FIG. 28
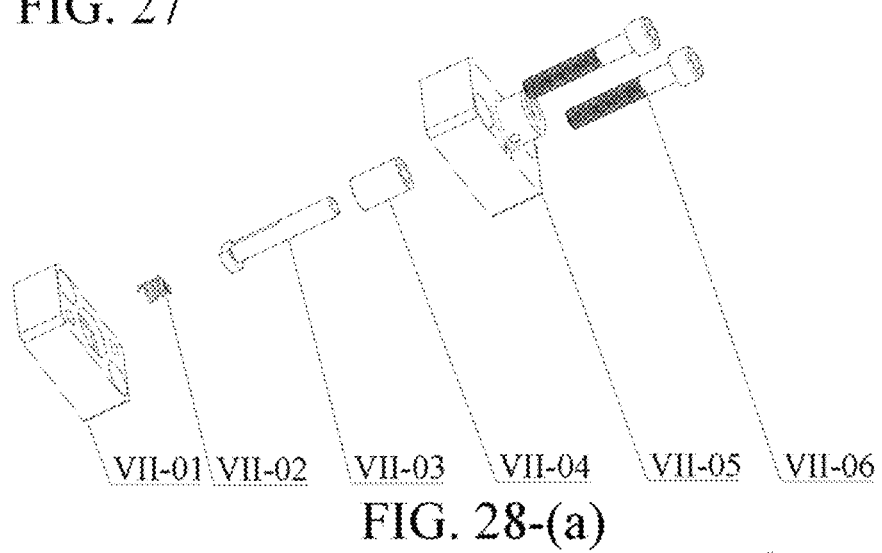
FIG. 28-(a)
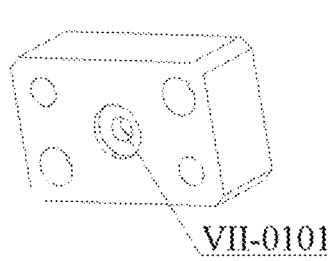
FIG. 28-(b)
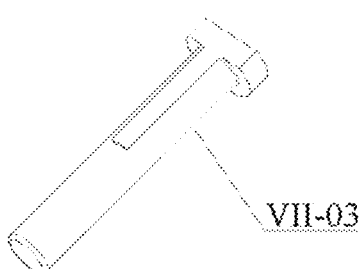
FIG. 28-(c)
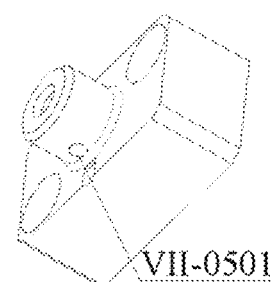
FIG. 28-(d)

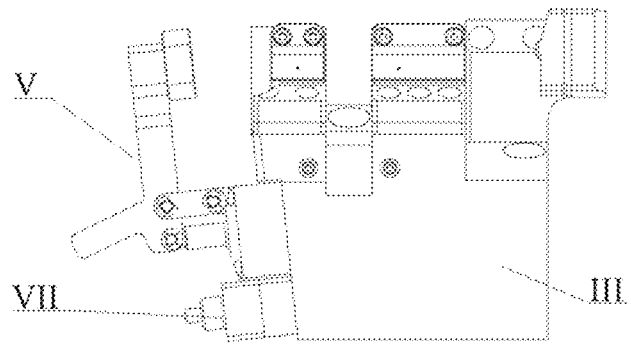
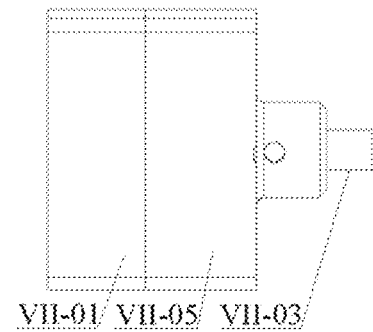
FIG. 29  FIG. 29-(a)
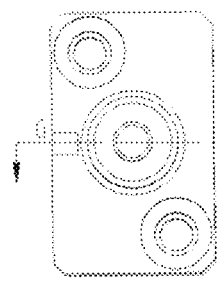
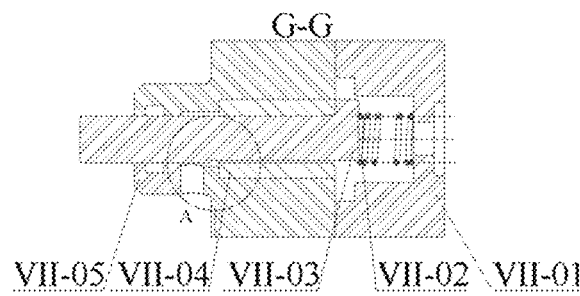
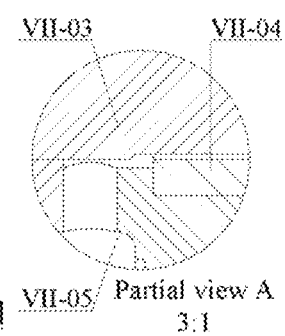
FIG. 29-(b)  FIG. 29-(c)  FIG. 29-(d)
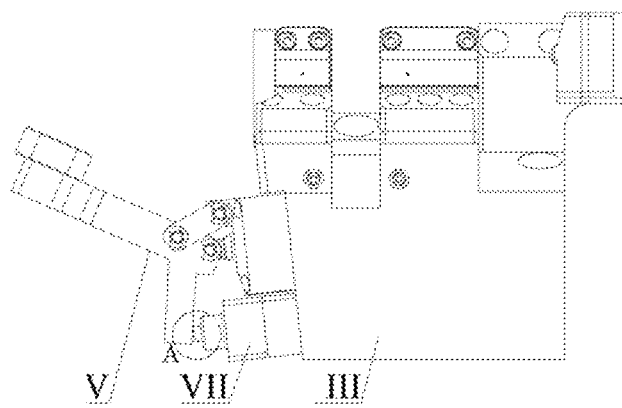
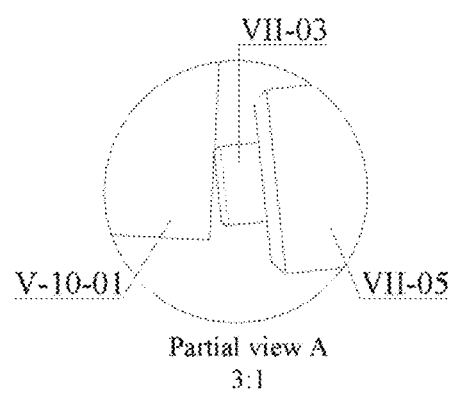
FIG. 30  FIG. 30-(a)

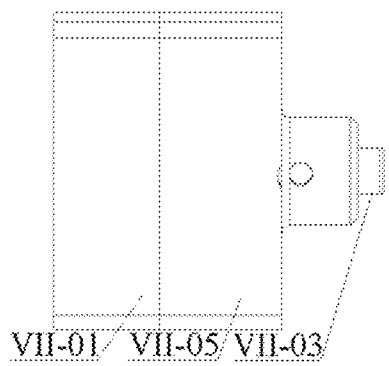
FIG. 30-(b)
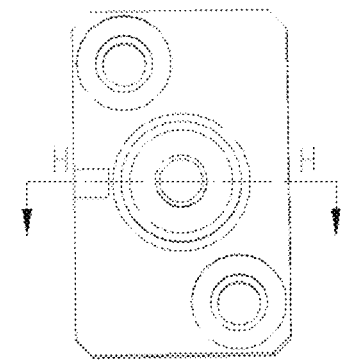
FIG. 30-(c)
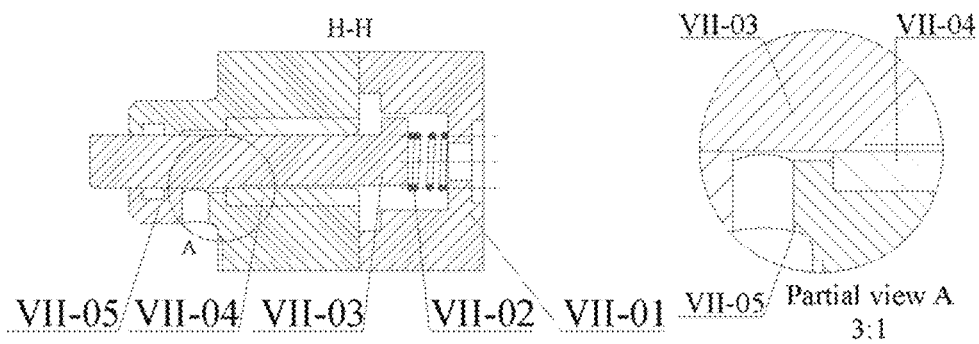
FIG. 30-(d)
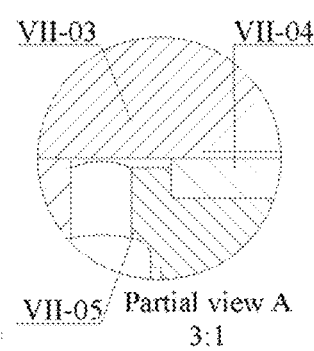
FIG. 30-(e)
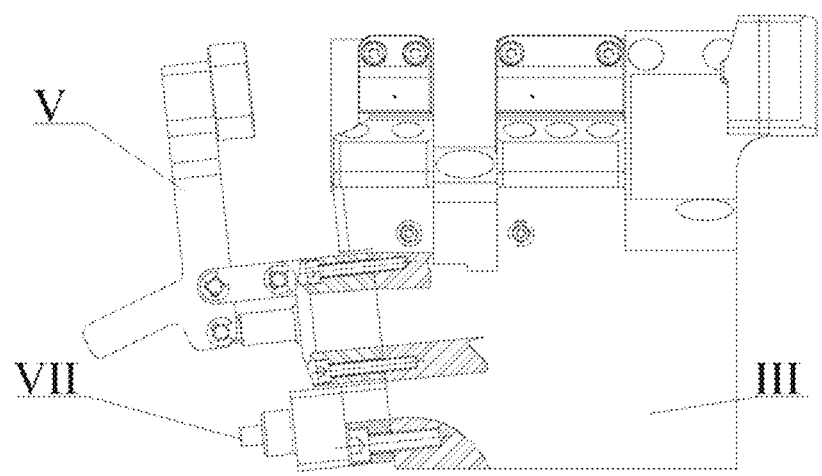
FIG. 31

MULTI-STATION TURNING TOOL BIT MILLING FIXTURE SYSTEM

BACKGROUND

Technical Field

The present disclosure belongs to the field of process equipment technologies, and particularly relates to a multi-station turning tool bit milling fixture system capable of intelligently detecting a clamping force.

Related Art

When a workpiece is machined on a machine tool, in order to ensure machining accuracy and improve production efficiency, it is necessary to ensure correct relative positions of the workpiece and a cutter, and this process is called positioning. In a cutting process, in order to prevent the workpiece in position from being damaged by an external force, a clamping force needs to be applied to the workpiece, and this process is called clamping. The whole process of positioning and clamping is called workpiece clamping. With the continuous development of science and technology, a machinery manufacturing industry plays an increasingly important role in today's society. How to speed up the production efficiency, improve the machining accuracy, and reduce machining costs is a goal constantly pursued by the machinery industry today.

The cutter belongs to basic process equipment in machining. An advanced cutter with high efficiency can obviously improve the machining efficiency. A structure, performance, and precision of the cutter all have a direct impact on the machining efficiency and quality; and meanwhile, also have a certain impact on a production technology level and economic benefits of the entire machinery manufacturing industry. A turning tool is the most widely used cutter in the use of all machine tool cutters, and turning is also one of the most commonly used machining methods, which is widely used.

With the continuous improvement of a social production level, there are constantly increasing demands for high-precision cutters in the field of machinery manufacturing. However, in the production process of traditional turning tools, mostly only one workpiece can be clamped by the traditional turning tools at a time, and the production efficiency is relatively low. Moreover, without positioning and clamping detection apparatus, whether the positioning and clamping of the workpiece meet the machining requirements is determined mostly based on the experience of operators in the entire cutter production process, resulting in relatively poor precision of the machined cutter. With the increasing costs of human resources, the traditional turning tool manufacturing method requires higher costs. Nowadays, the machinery manufacturing industry urgently needs a fixture system with high efficiency, high precision, high degree of automation, and low cost to produce turning tool bits.

Wuxi No. 7 Machine Tool Co., Ltd. in Wuxi City, Jiangsu Province invented an air-detection fixture, which includes a sleeve spindle, a push-pull rod, an air pipe, an end cover, a sealing plate, an airtight end face supporting seat, and a workpiece mounting seat. A spindle is rotatably supported in an inner hole of the sleeve spindle through a bearing structure, the push-pull rod is arranged in the inner hole of the spindle, and the air pipe is arranged in an inner hole of the push-pull rod. A left end face cover of the sleeve spindle is provided with a left end cover 1 and a left end cover 2, and a right end face cover of the sleeve spindle is provided with a right end cover 1 and a right end cover 2. A right end face of the spindle is firmly connected to a fixture body, an outer end face cover of the fixture body is provided with a sealing plate, a mounting hole of the sealing plate is provided with an airtight end face supporting seat, the air pipe is communicated with an air duct on the airtight end face supporting seat, an outer end of the airtight end face supporting seat is attached to the workpiece mounting seat, and the air duct on the airtight end face supporting seat is communicated with an air duct on the workpiece mounting seat. The fixture may ensure that parts are installed in place and improve the yield of part machining.

Although this apparatus can detect a state of the workpiece during positioning and clamping, a structure of the fixture is not compact, and only one workpiece can be clamped at a time, resulting in relatively low production efficiency and not suitable for mass production.

Xue Jinxue et al. of Henan University of Science and Technology invented a multi-station hydraulic milling machine fixture, which includes a bottom plate, where two outer clamping blocks are arranged at left and right intervals on the bottom plate, and a diamond-shaped telescopic frame which is capable of being telescopic in left and right directions is arranged between the two outer clamping blocks. The diamond-shaped telescopic frame is provided with three sets of rivet articulated shafts along a front-rear direction, each set of rivet articulated shafts includes a plurality of rivet-type articulated shafts which are sequentially arranged from left to right, each rivet-type articulated shaft is connected to an inner clamping block, the inner clamping block is movably connected below the diamond-shaped telescopic frame through the rivet-type articulated shaft connected to the inner clamping block, and a plurality of inner clamping blocks corresponding to a plurality of rivet-type articulated shafts are sequentially arranged from left to right. The bottom plate is also provided with a hydraulic clamping apparatus capable of adjusting a distance between two outer clamping blocks, and adjusting screws for adjusting a position of the diamond-shaped telescopic frame are respectively arranged on near the front and rear ends on each outer clamping block.

Although this apparatus can clamp a plurality of workpieces for machining at a time, and the machining efficiency is improved, the working state of the workpiece when being positioned, clamped, or loosened cannot be identified by a computer, so this apparatus is not suitable for unmanned production in an automatic production line.

A modern machine tool fixture for producing a cavity of the turning tool bit should have the characteristics of good positioning accuracy, reliable clamping, multi-station serial production, and high degree of automation, being equipped with an automatic detection device, good interaction with computers, and being suitable for an intelligent production line, etc. However, the development of related equipment is not satisfactory, and there are many shortcomings such as lack of positioning detection apparatus, lack of clamping force detection apparatus, low production efficiency, low degree of automation, and lack of good interaction with computers.

SUMMARY

An objective of the present disclosure is to provide a multi-station turning tool bit milling fixture system capable of intelligently detecting a clamping force to overcome the above-mentioned shortcomings of the prior art. The fixture system may completely limit six degrees of freedom of a workpiece for positioning, and may achieve good positioning and clamping by cooperating with an upper clamping mechanism and an end face clamping mechanism; an air-detection mechanism characterizes a current state of the workpiece through an air pressure value of an air-detection pipeline arranged inside the fixture, to ensure the stable clamping of the workpiece; and meanwhile, a working state of the fixture system is determined by identifying an air pressure in the air-detection pipeline, and an intelligent production line is controlled to carry out a next procedure or re-position and clamp the workpiece.

An invention objective of the present disclosure is to provide a multi-station turning tool bit milling fixture system capable of intelligently detecting a clamping force. To achieve the above objective, the present disclosure employs the following technical solutions:

the multi-station turning tool bit milling fixture system capable of intelligently detecting a clamping force includes a lower bottom plate mechanism, a supporting plate mechanism, a positioning mechanism, an upper clamping mechanism, an end face clamping mechanism, and an end face clamping air-detection mechanism;

the lower bottom plate mechanism includes a substrate of the lower bottom plate, and a first hydraulic pipeline is arranged in the substrate of the lower bottom plate for transmitting hydraulic fluid to an upper clamping hydraulic cylinder and an end face clamping hydraulic cylinder;

the supporting plate mechanism is fixedly connected to the lower bottom plate mechanism, and the supporting plate mechanism is internally provided with an air-detection pipeline for transmitting air to the positioning mechanism and the upper clamping mechanism;

the positioning mechanism is fixedly connected to the supporting plate mechanism, the positioning mechanism comprises a positioning substrate, and a plurality of supporting blocks are fixedly arranged on the positioning substrate for clamping a workpiece to implement six-point positioning;

the upper clamping mechanism is fixedly connected to the supporting plate mechanism, the upper clamping mechanism comprises a V-shaped clamping block, the V-shaped clamping block is connected to an upper clamping big arm, the upper clamping big arm is connected to the upper clamping hydraulic cylinder through an ejector rod mechanism, and the upper clamping hydraulic cylinder works to drive the V-shaped clamping block through the upper clamping big arm to clamp the workpiece above the workpiece;

the end face clamping mechanism is fixedly connected to the positioning substrate, the end face clamping mechanism comprises an end face clamping block, the end face clamping block is connected to an end face clamping big arm, the end face clamping big arm is connected to the end face clamping hydraulic cylinder through a piston ejector rod, and the end face clamping hydraulic cylinder works to drive the end face clamping block through the end face clamping big arm to clamp the workpiece at a side face of the workpiece; and the end face clamping air-detection mechanism comprises an air pressure detection component, the air pressure detection component is connected to a controller, and the air pressure detection component is capable of detecting a pressure of the air-detection pipeline to identify working states of the positioning mechanism and the upper clamping mechanism.

As a further technical solution, the supporting plate mechanism is provided with a plurality of stations, each station is correspondingly provided with a positioning mechanism, an upper clamping mechanism, and the end face clamping mechanism, and a zigzag groove is provided at a top portion of the supporting plate mechanism to be engaged with and fixedly connected to the upper clamping mechanism.

As a further technical solution, a second hydraulic pipeline is arranged in the supporting plate mechanism, the second hydraulic pipeline is communicated with the first hydraulic pipeline, and the second hydraulic pipeline is communicated with the upper clamping hydraulic cylinder and the end face clamping hydraulic cylinder to transmit hydraulic fluid to the upper clamping hydraulic cylinder and the end face clamping hydraulic cylinder; a cutting lubricating mechanism is also arranged on the supporting plate mechanism, the cutting lubricating mechanism is provided with a fluid nozzle, the fluid nozzle is communicated with a third hydraulic pipeline arranged in the supporting plate mechanism, and the fluid nozzle of the cutting lubricating mechanism is capable of spraying a cutting fluid to a cutting area for lubrication.

As a further technical solution, the supporting block includes a bottom supporting block, a side supporting block, and a rear supporting block, the bottom supporting block and the side supporting block are secured to the positioning substrate, the rear supporting block is secured to a connecting block, and the connecting block is L-shaped and connected to a side portion of the positioning substrate.

As a further technical solution, the positioning substrate is internally provided with a workpiece main positioning face airtight detection pipeline and a workpiece main end face airtight detection pipeline, both the workpiece main positioning face airtight detection pipeline and the workpiece main end face airtight detection pipeline are communicated with the air-detection pipeline, and the workpiece main positioning face airtight detection pipeline is communicated with the bottom supporting block and the side supporting block, while the workpiece main end face airtight detection pipeline is communicated with the rear supporting block, and whether a main positioning face and a main end face of the workpiece are positioned in place can be detected by detecting the pressure of the air-detection pipeline.

As a further technical solution, the upper clamping big arm is hinged with the ejector rod mechanism, the upper clamping big arm is also hinged with a connecting rod, and the connecting rod is secured to the upper clamping hydraulic cylinder; the V-shaped clamping block is provided with a V-shaped opening, and the V-shaped opening is arranged downwards; and the end face clamping big arm is hinged with the piston ejector rod, the end face clamping big arm is also hinged with the connecting rod, and the connecting rod is secured to the end face clamping hydraulic cylinder.

As a further technical solution, an air-detection shell of the upper clamping mechanism is fixedly arranged above the upper clamping hydraulic cylinder, an air-detection sleeve is embedded in the air-detection shell of the upper clamping mechanism, both an upper side portion and a lower side portion of the air-detection sleeve are provided with air inlet holes, the two air inlet holes are arranged at 90 degrees, the air-detection sleeve is provided with two air outlet holes between the two air inlet holes, the two air outlet holes are provided opposite to one of the air inlet holes, and both the two air inlet holes are communicated with the air-detection pipeline.

As a further technical solution, a bottom portion of the ejector rod mechanism is connected to the air-detection sleeve, and an air blocking ring is arranged at the bottom portion of the ejector rod mechanism, when the upper clamping mechanism loosens the workpiece, the ejector rod mechanism moves down the air blocking ring to block the air inlet hole at the lower side portion, and when the upper clamping mechanism clamps the workpiece, the ejector rod mechanism moves up the air blocking ring to block the air inlet hole at the upper side portion.

As a further technical solution, the air pressure detection component includes an upper shell and a lower shell which are oppositely arranged, an air-detection pin is arranged by passing through the upper shell from the lower shell, and the air-detection pin extends beyond the upper shell, a return spring is arranged in the upper shell to support the air-detection pin, an air outlet hole is provided in the upper shell, an air inlet hole is provided in the lower shell, and the air inlet hole is communicated with the air-detection pipeline; and an outer portion of the end face clamping big arm is fixedly connected to a fixing rod, and when the end face clamping mechanism loosens the workpiece, the end face clamping big arm turns over the fixing rod to contact with the air-detection pin.

As a further technical solution, the air pressure detection component includes a micro pressure sensor, and the micro pressure sensor is fixedly arranged at the end face clamping block; and the upper clamping big arm is also fixedly provided with a shaft pin type sensor.

Beneficial effects of the present disclosure are as follows:

(1) According to the fixture system of the present disclosure, the positioning mechanism may characterize a positioning state of the workpiece by an air pressure value of the air-detection pipeline inside the positioning substrate, and a computer may determine whether the positioning and clamping of the workpiece meets the machining requirements by analyzing the air pressure value, thereby implementing unmanned management and intelligent detection, and preventing a decrease a machining yield of the workpiece caused by the failure of positioning and clamping.

(2) According to the fixture system of the present disclosure, by changing the air pressure in the air-detection pipeline, air-detection apparatuses in the end face clamping air-detection mechanism and the upper clamping mechanism can make the computer identify the current working state of the fixture, so as to control the production line to carry out a next procedure, thereby implementing unmanned management and automatic production of the intelligent production line and reducing the costs of human resources.

(3) According to the fixture system of the present disclosure, the upper clamping mechanism can clamp two planes at a time through the design of an installation angle, thereby improving the production efficiency and increasing the clamping reliability.

(4) According to the fixture system of the present disclosure, a plurality of workpieces can be positioned and clamped at a time, thereby improving the production efficiency.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

FIG. 3-(a) is a partial enlarged view of a section A in FIG. 3;

FIG. 4-(a) is a partial enlarged view of FIG. 4;

FIG. 5-(a) is a partial enlarged view of a section A in FIG. 5;

FIG. 7-(a) is an axonometric view a of a positioning substrate;

FIG. 7-(b) is an axonometric view b of a positioning substrate;

FIG. 7-(c) is an axonometric view of a connecting block;

FIG. 7-(d) is an exploded view of a supporting block 2;

FIG. 7-(e) is an axonometric view of a connecting block;

FIG. 7-(f) is a semi-sectional view of a supporting gasket 5;

FIG. 8 is an axonometric view of engagement between a supporting gasket 1 and a supporting block 1;

FIG. 8-(a) is a left view of engagement between the supporting gasket 1 and the supporting block 1;

FIG. 8-(b) is a sectional view of engagement between the supporting gasket 1 and the supporting block 1;

FIG. 9 is an axonometric view of engagement between a supporting gasket 3 and a supporting block 2;

FIG. 9-(a) is a left view of engagement between a supporting gasket 3 and a supporting block 2;

FIG. 9-(b) is a sectional view of engagement between the supporting gasket 3 and the supporting block 2;

FIG. 10 is an axonometric view of a supporting block 5 added with a supporting gasket 3;

FIG. 10-(a) is a front view of the supporting block 5 added with the supporting gasket 3;

FIG. 10-(b) is a sectional view of the supporting block 5 added with the supporting gasket 3;

FIG. 11 is an axonometric view of a supporting block 7 added with a supporting gasket 4;

FIG. 11-(a) is a front view of the supporting block 7 added with the supporting gasket 4;

FIG. 11-(b) is a sectional view of the supporting block 7 added with the supporting gasket 4;

FIG. 12 is an axonometric view of a supporting block 8 added with a supporting gasket 5;

FIG. 12-(a) is a front view of the supporting block 8 added with the supporting gasket 5;

FIG. 12-(b) is a sectional view of the supporting block 8 added with the supporting gasket 5;

FIG. 13-(a) is a partial enlarged view of a portion A in FIG. 13;

FIG. 14-(a) is an exploded view of the upper clamping mechanism;

FIG. 14-(b) is a partial exploded view of the upper clamping mechanism;

FIG. 14-(c) is an axonometric view of a V-shaped clamping block 1;

FIG. 14-(d) an axonometric view of a V-shaped clamping block 2;

FIG. 14-(e) is an axonometric view of a pin seat;

FIG. 14-(f) is an axonometric view of an air-detection shell of an upper clamping mechanism;

FIG. 14-(g) is an axonometric view of a hydraulic cylinder body of the upper clamping mechanism;

FIG. 15 is an axonometric view of an air-detection sleeve of the upper clamping mechanism;

FIG. 15-(a) is a front view of the air-detection sleeve of the upper clamping mechanism;

FIG. 15-(b) is a rear view of the air-detection sleeve of the upper clamping mechanism;

FIG. 15-(c) is a left view of the air-detection sleeve of the upper clamping mechanism;

FIG. 15-(d) is a top view of the air-detection sleeve of the upper clamping mechanism;

FIG. 15-(e) is a sectional view of an A-A section of FIG. 15-(d);

FIG. 15-(f) is a partial enlarged view of a portion B in FIG. 15-(e);

FIG. 15-(g) is a top view of the air-detection sleeve of the upper clamping mechanism;

FIG. 15-(h) is a sectional view of a B-B section of FIG. 15-(g);

FIG. 16 is an exploded view of an ejector rod mechanism;

FIG. 17 is an axonometric view of a pin shaft;

FIG. 18 is an axonometric view of a connecting rod;

FIG. 19 is an axonometric view of an upper clamping big arm 1;

FIG. 20 is an axonometric view of a positioning pin shaft of the V-shaped clamping block 1;

FIG. 21 is an axonometric view of an upper clamping big arm 2;

FIG. 21-(a) is an exploded view of the upper clamping big arm 2;

FIG. 21-(b) is an axonometric view of the upper clamping big arm 2;

FIG. 21-(c) is an axonometric view of a shaft pin type sensor;

FIG. 22 is a partial sectional view of the upper clamping mechanism;

FIG. 22-(a) is a partial enlarged view of a portion A in FIG. 22;

FIG. 23-(a) is a sectional view of a C-C section of FIG. 23;

FIG. 23-(b) is a partial enlarged view of a portion A of FIG. 23-(a);

FIG. 23-(c) is a side view of the upper clamping mechanism in a loosening state;

FIG. 23-(d) is a sectional view of a D-D section of FIG. 23-(c);

FIG. 23-(e) is a front view of the upper clamping mechanism in the clamping state;

FIG. 23-(f) is a sectional view of an E-E section of FIG. 23-(e);

FIG. 23-(g) is a front view of the upper clamping mechanism in the loosening state;

FIG. 23-(h) is a sectional view of an F-F section of FIG. 23-(g);

FIG. 23-(i) is a partial enlarged view of a portion A in FIG. 23-(h);

FIG. 24-(a) is a partial enlarged view of a portion A in FIG. 24;

FIG. 25-(a) is an exploded view of the end face clamping mechanism;

FIG. 25-(b) is an axonometric view of a sealing platen of the end face clamping mechanism;

FIG. 25-(c) is an axonometric view of an end face clamping big arm 1;

FIG. 26 is an axonometric view of an end face clamping big arm 2;

FIG. 26-(a) is an exploded view of the end face clamping big arm 2;

FIG. 26-(b) is an axonometric view of the end face clamping block 2;

FIG. 26-(c) is an exploded view of the end face clamping block 2;

FIG. 26-(d) is an axonometric view of a micro pressure sensor;

FIG. 27 is an axonometric view of a fluid nozzle of a cutting lubricating mechanism;

FIG. 28 is an axonometric view of an end face clamping air-detection mechanism;

FIG. 28-(a) is an exploded view of the end face clamping air-detection mechanism;

FIG. 28-(b) is an axonometric view of a lower shell of the end face clamping air-detection mechanism;

FIG. 28-(c) is an axonometric view of an air-detection pin;

FIG. 28-(d) is an axonometric view of an upper shell of the end face clamping air-detection mechanism;

FIG. 29 is a diagram of a relative position relationship between the end face clamping big arm 1 and the air-detection pin in the end face clamping air-detection mechanism when the end face clamping mechanism is in a clamping state;

FIG. 29-(a) is an axonometric view of a working state of the end face clamping air-detection mechanism when an end face clamping device is in a clamping state;

FIG. 29-(b) is a top view when the end face clamping air-detection mechanism is not compressed by the end face clamping big arm 1;

FIG. 29-(c) is a sectional view of a G-G section of FIG. 29-(b);

FIG. 29-(d) is a partial enlarged view of a portion A in FIG. 29-(c);

FIG. 30 is a diagram of a relative position relationship between the end face clamping big arm 1 and the air-detection pin in the end face clamping air-detection mechanism when the end face clamping device is in a loosening state;

FIG. 30-(a) is a partial enlarged view of a portion A in FIG. 30;

FIG. 30-(b) is an axonometric view of a working state of the end face clamping air-detection mechanism when the end face clamping device is in the loosening state;

FIG. 30-(c) is a top view when the end face clamping air-detection mechanism is compressed by the end face clamping big arm 1;

FIG. 30-(d) is a sectional view of an H-H section of FIG. 30-(c);

FIG. 30-(e) is a partial enlarged view of a portion A in FIG. 30-(d); and

FIG. 31 is a partial sectional view of a connecting portion between the end face clamping air-detection mechanism and a positioning substrate and a connecting portion between the end face clamping mechanism and the positioning substrate.

Figure 1:
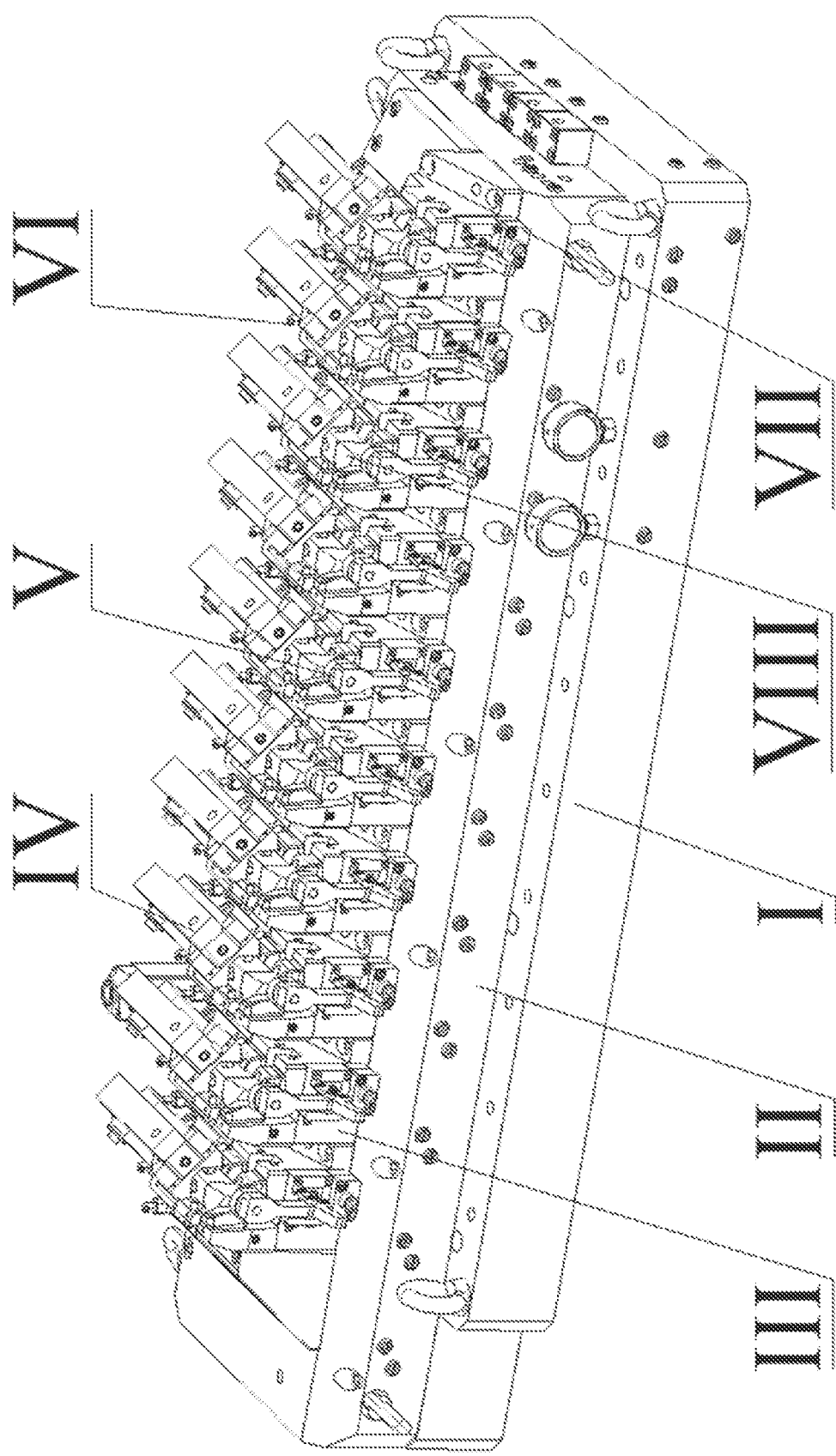
FIG. 1 is an axonometric view of a multi-station turning tool bit milling fixture system capable of intelligently detecting a clamping force.

In the drawings, I refers to a lower bottom plate mechanism, II refers to a supporting plate mechanism, III refers to a positioning mechanism, IV refers to an upper clamping mechanism, V refers to an end face clamping mechanism, VI refers to a cutting lubricating mechanism, VII refers to an end face clamping air-detection mechanism, and VIII refers to a workpiece;

I-01 refers to a tool setting device, I-02 refers to an industrial suspension ring, I-03 refers to a fluid outlet hole 1, I-04 refers to a fluid outlet hole 2, I-05 refers to a fluid inlet hole 1, I-06 refers to a fluid inlet hole 2, I-07 refers to a fluid inlet hole 3, I-08 refers to a fluid inlet hole 4, I-09 refers to a fluid outlet hole 3, I-10 refers to a fluid outlet hole 4, I-11 refers to a fluid pressure gage mounting hole, and I-12 refers to a fluid pressure gage mounting hole;

II-01 refers to a fluid inlet hole 5, II-02 refers to a fluid inlet hole 6, II-03 refers to a fluid inlet hole 7, II-04 refers to a fluid inlet hole 8, II-05 refers to an air outlet hole 1, II-06 refers to an air outlet hole 2, II-07 refers to an air outlet hole 3, II-08 refers to a fluid outlet hole 5, II-09 refers to a fluid outlet hole 6, II-10 refers to an air outlet hole 4, II-11 refers to an air outlet hole 5, II-12 refers to an air inlet hole 1, II-13 refers to an air inlet hole 2, II-14 refers to an air inlet hole 3, II-15 refers to an air inlet hole 4, II-16 refers to an air inlet hole 5, II-17 refers to a fluid inlet hole 9, II-18 refers to a fluid outlet hole 7, II-19 refers to a fluid outlet hole 8, II-20 refers to a fluid outlet hole 9, II-21 refers to a fluid outlet hole 10, and II-22 refers to a fluid outlet hole 11;

III-01 refers to a positioning substrate, III-02-01 refers to a supporting block 1, III-02-02 refers to a supporting block 2, III-03 refers to a supporting gasket 1, III-04 refers to a supporting gasket 2, III-05-01 refers to a supporting block 3, III-05-02 refers to a supporting block 4, III-06 refers to a hexagon socket head cap screw, III-07 refers to a connecting block, III-08 refers to a hexagon socket head cap screw, III-09 refers to a supporting gasket 3, III-10-01 refers to a supporting block 5, III-10-02 refers to a supporting block 6, III-11 refers to a hexagon socket head cap screw, III-12 refers to a hexagon socket head cap screw, III-13 refers to a supporting block 7, III-14 refers to a supporting gasket 4, III-15 refers to a supporting block 8, and III-16 refers to a supporting gasket 5;

III-0101 refers to an air inlet hole 6, III-0102 refers to a fluid inlet hole 10, III-0103 refers to an air inlet hole 7, III-0104 refers to an air inlet hole 8, III-0105 refers to a fluid inlet hole 11, III-0106 refers to a fluid outlet hole 12, III-0107 refers to a fluid outlet hole 13, III-0108 refers to an air outlet hole 6, III-0109 refers to an air outlet hole 7, III-0110 refers to an air outlet hole 8, III-0111 refers to an air outlet hole 9, III-0112 refers to an air outlet hole 10, III-0113 refers to an air outlet hole 11, III-02-0201 refers to a support nail securing plate, III-02-0202 refers to a support nail, III-0701 refers to an air inlet hole 9, and III-0702 refers to an air outlet hole 12;

IV-01-01 refers to a V-shaped clamping block 1, IV-01-02 refers to a V-shaped clamping block 2, IV-02 refers to a pin seat, IV-03 refers to a gasket, IV-04 refers to a sealing cover of an air-detection shell of the upper clamping mechanism, IV-05 refers to an air-detection shell of the upper clamping mechanism, IV-06 refers to an upper clamping hydraulic cylinder body, IV-07 refers to a hexagon socket head cap screw, IV-08 refers to a piston ejector rod, IV-09 refers to a hydraulic cylinder sealing cover, IV-10 refers to an air-detection sleeve, IV-11 refers to a hexagon socket head cap screw, IV-12 refers to a sleeve, IV-13 refers to an ejector rod mechanism, IV-14 refers to a pin shaft, IV-15 refers to a connecting rod, IV-16 refers to a B-type pin, IV-17 refers to a gasket, IV-18 refers to a hexagon socket head cap screw, IV-19 refers to a hexagon socket head cap screw, IV-20-01 refers to an upper clamping big arm 1, IV-20-02 refers to an upper clamping big arm 2, IV-21-01 refers to a positioning pin shaft of the V-shaped clamping block 1, IV-21-02 refers to a shaft pin type sensor, and IV-22 refers to a positioning screw;

IV-01-0101 refers to a positioning hole of the V-shaped clamping block 1, IV-01-0201 refers to a positioning hole of the V-shaped clamping block 2, IV-0201 refers to a threaded hole of the pin seat, IV-0202 refers to a pin shaft hole of the pin seat, IV-0501 refers to an air inlet hole 10, IV-0502 refers to an air inlet hole 11, IV-0503 refers to a fluid outlet hole 14, IV-0504 refers to a fluid outlet hole 15, IV-0505 refers to a fluid inlet hole 12, IV-0506 refers to a fluid inlet hole 13, IV-0507 refers to an air outlet hole 13, IV-0508 refers to an air outlet hole 14, IV-0601 refers to a fluid inlet hole 14, IV-0602 refers to a fluid inlet hole 15, IV-1001 refers to an air inlet hole 12, IV-1002 refers to an air inlet hole 13, IV-1003 refers to an air outlet hole 15, IV-1004 refers to an air outlet hole 16, IV-1301 refers to an ejector rod, IV-1302 refers to an air blocking ring, IV-1303 refers to a connecting pin, IV-1401 refers to a pin hole, IV-1501 refers to a pin hole 1 of the connecting rod, IV-1502 refers to a pin hole 2 of the connecting rod, IV-20-0101 refers to a pin shaft hole 1 of the upper clamping big arm 1, IV-20-0102 refers to a positioning screw hole of the upper clamping big arm 1, IV-20-0103 refers to a pin shaft hole 2 of the upper clamping big arm 1, IV-20-0104 refers to a pin shaft hole 3 of the upper clamping big arm 1, IV-20-0201 refers to a sensor hole of the upper clamping big arm 2, IV-20-0202 refers to a sensor positioning screw hole of the upper clamping big arm 2, IV-20-0203 refers to a pin shaft hole 1 of the upper clamping big arm 2, IV-20-0204 refers to a pin shaft hole 2 of the upper clamping big arm 2, IV-21-0101 refers to a positioning hole of a positioning pin shaft of the V-shaped clamping block 1, IV-21-0201 refers to a positioning hole of the shaft pin type sensor, and IV-21-0202 refers to a sensing line of the shaft pin type sensor;

V-01 refers to a sealing screw, V-02 refers to a sealing platen, V-03 refers to a piston ejector rod, V-04 refers to a hydraulic cylinder sealing base, V-05 refers to an end face hydraulic cylinder body, V-06 refers to an end face hydraulic cylinder sealing cover, V-07-01 refers to an end face clamping block 1, V-07-02 refers to an end face clamping block 2, V-08 refers to a connecting rod, V-09 refers to a pin shaft, V-10-01 refers to an end face clamping big arm 1, V-10-02 refers to an end face clamping big arm 2, V-11 refers to a hexagon socket head cap screw, V-12 refers to a hexagon socket head cap screw, V-13 refers to a connecting rod, V-14 refers to a positioning clamp spring, V-15 refers to a hydraulic pipeline sealing screw, and V-16 refers to a hexagon socket head cap screw;

V-0201 refers to a fluid inlet hole 16, V-0202 refers to a fluid inlet hole 17, V-07-0201 refers to an end face clamping plate, V-07-0202 refers to a micro pressure sensor, V-07-0203 refers to a hexagon socket head cap screw, V-10-0101 refers to a pin shaft hole, V-10-0102 refers to a pin shaft hole, V-10-0103 refers to a groove for assembling the clamping block, and V-10-0104 refers to a positioning pin shaft hole;

VII-01 refers to a lower shell of an end face clamping air-detection device, VII-02 refers to a return spring, VII-03 refers to an air-detection pin, VII-04 refers to a sleeve, VII-05 refers to an upper shell of the end face clamping air-detection device, and VII-06 refers to a hexagon cylindrical screw; and VII-0101 refers to an air inlet hole 14, and VII-0501 refers to an air outlet hole 17.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should be further understood that terms "include" and/or "comprise" used in this specification indicate that there are features, steps, operations, devices, assemblies, and/or combinations thereof;

For convenience of description, the words "above", and "below" appearing in the present disclosure only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present disclosure.

As introduced in the background art, there are shortcomings in the prior art. In order to resolve the above technical problems, this application proposes a multi-station turning tool bit milling fixture system capable of intelligently detecting a clamping force.

Embodiment 1

The fixture system disclosed in this embodiment will be further explained with reference to the drawings hereinafter.

A multi-station turning tool bit milling fixture system capable of intelligently detecting a clamping force is mainly used for machining a turning tool bit with cutter bar specifications of 16×16 mm, 20×20 mm and 25×25 mm. The fixture system integrates functions of positioning, clamping, clamping force detection, positioning detection, and cutting lubrication.

When a workpiece is positioned on the fixture system, six degrees of freedom of the workpiece are completely limited. Good positioning and clamping may be implemented by engagement with an upper clamping mechanism and an end face clamping mechanism. An air-detection mechanism characterizes a current state of the workpiece through an air pressure value of an air-detection pipeline arranged inside the fixture, to ensure stable clamping of the workpiece. Meanwhile, a computer determines a working state of the fixture system by identifying an air pressure in the air-detection pipeline, and controls an intelligent production line to carry out a next procedure or re-position and clamp the workpiece.

When the workpiece is clamped, a machine tool starts to process the workpiece. In this case, a cutting lubricating system in the fixture system sprays a cutting fluid to a machined part of the workpiece, thereby reducing cutter wear and increasing a machining yield of the workpiece.

With reference to FIG. 1, FIG. 5, FIG. 13, FIG. 24, and FIG. 31, the multi-station turning tool bit milling fixture system capable of intelligently detecting a clamping force is formed by seven parts including a lower bottom plate mechanism I, a supporting plate mechanism II, a positioning mechanism III, an upper clamping mechanism IV, an end face clamping mechanism V, a cutting lubricating mechanism VI, and an end face clamping air-detection mechanism VII. The lower bottom plate mechanism I and the supporting plate mechanism II are connected by a hexagon socket head cap screw, the positioning mechanism III and the supporting plate mechanism II are connected by a hexagon socket head cap screw, the upper clamping mechanism IV and the supporting plate mechanism II are connected by a hexagon socket head cap screw, the end face clamping mechanism V and the positioning mechanism III are connected by a hexagon socket head cap screw, and the end face clamping air-detection mechanism VII and the positioning mechanism III are connected by a hexagon socket head cap screw.

Figure 2:
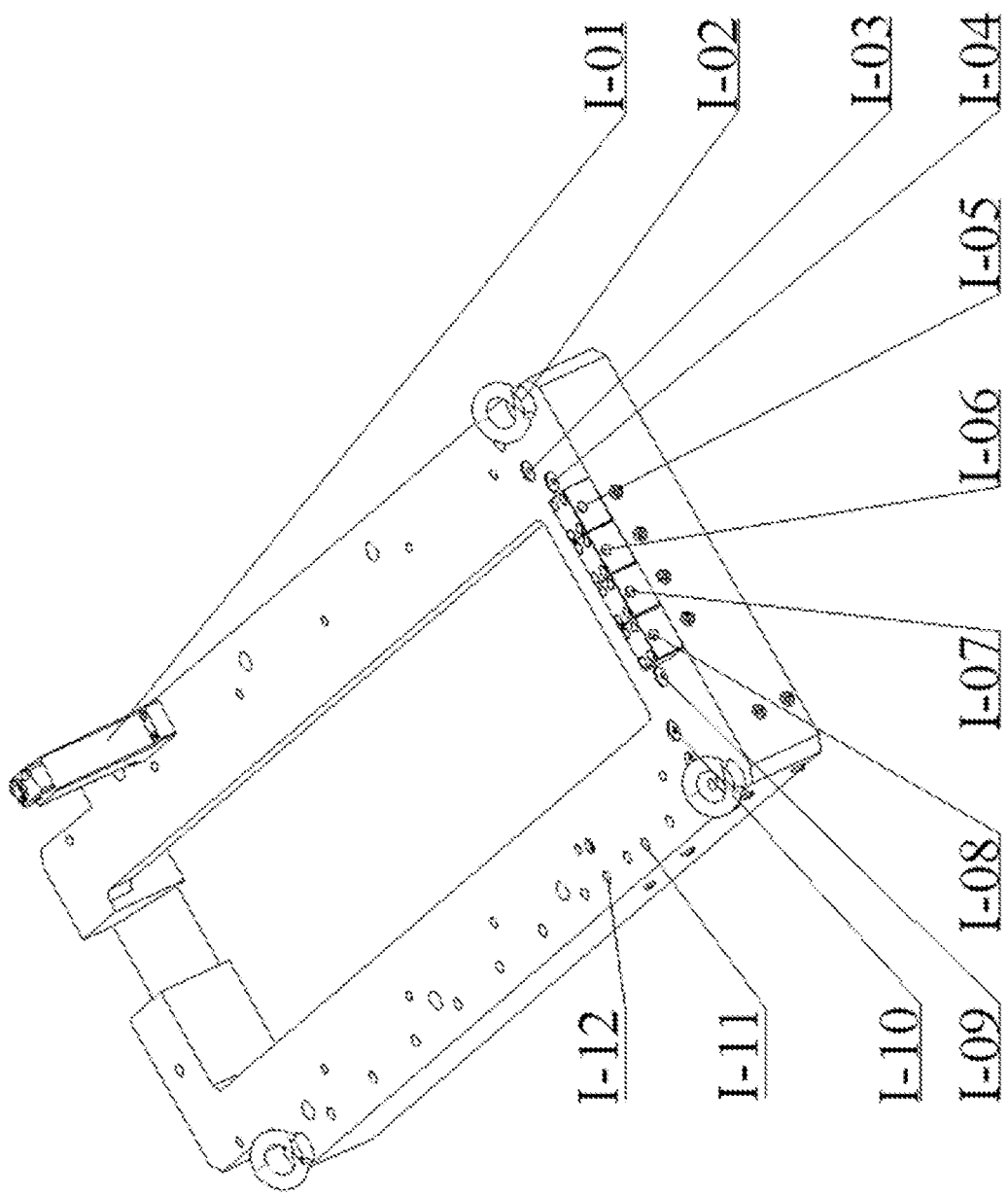
FIG. 2 is an axonometric view of a lower bottom plate mechanism.

As shown in FIG. 2, the lower bottom plate mechanism is formed by a substrate of the lower bottom plate, a tool setting device I-01, an industrial suspension ring I-02, and a hydraulic fluid port. Tool setting methods for fixtures usually include a workpiece trial cutting method and a tool setting method using a tool setting device. The tool setting method using a tool setting device does not require cutting the workpiece again every time the fixture is mounted and used, and therefore is more convenient. The tool setting device adopted in the present disclosure makes the cutter in a correct position relative to the fixture system. A hydraulic pipeline is arranged in the substrate of the lower bottom plate for transmitting hydraulic fluid to an upper clamping hydraulic cylinder and an end face clamping hydraulic cylinder. The hydraulic fluid port is used to ensure stable input and output of the hydraulic fluid and prevent leakage. The hydraulic fluid is input through a fluid inlet hole provided on the lower bottom plate mechanism, transmitted to a fluid outlet hole through a hydraulic pipeline arranged inside the lower bottom plate mechanism, and then transmitted to a fluid inlet hole of the supporting plate mechanism for next operation. A fluid pressure gage mounting hole I-11 and a fluid pressure gage mounting hole I-12 provided on the lower bottom plate mechanism are used for mounting a fluid pressure gauge.

Figure 3:
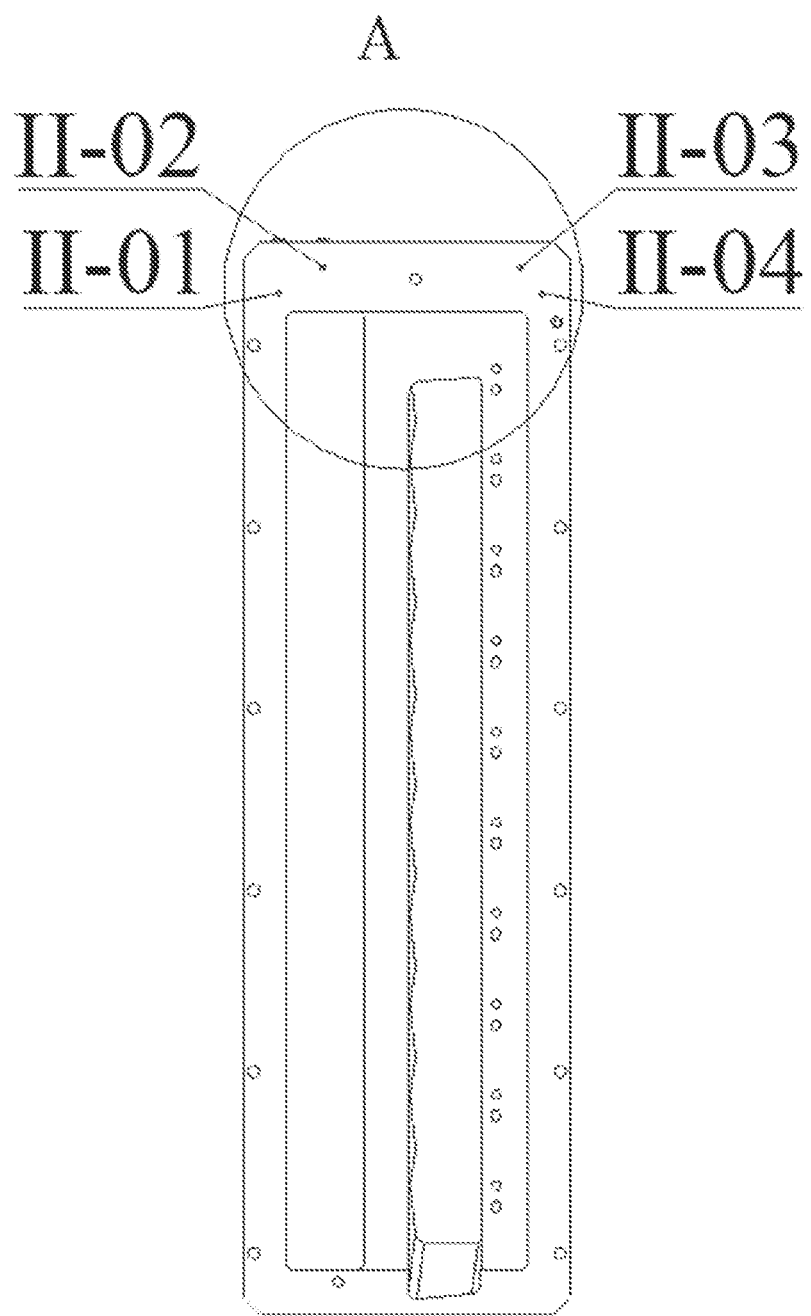
FIG. 3 is a front view of a bottom face of a supporting plate mechanism.
Figure 4:
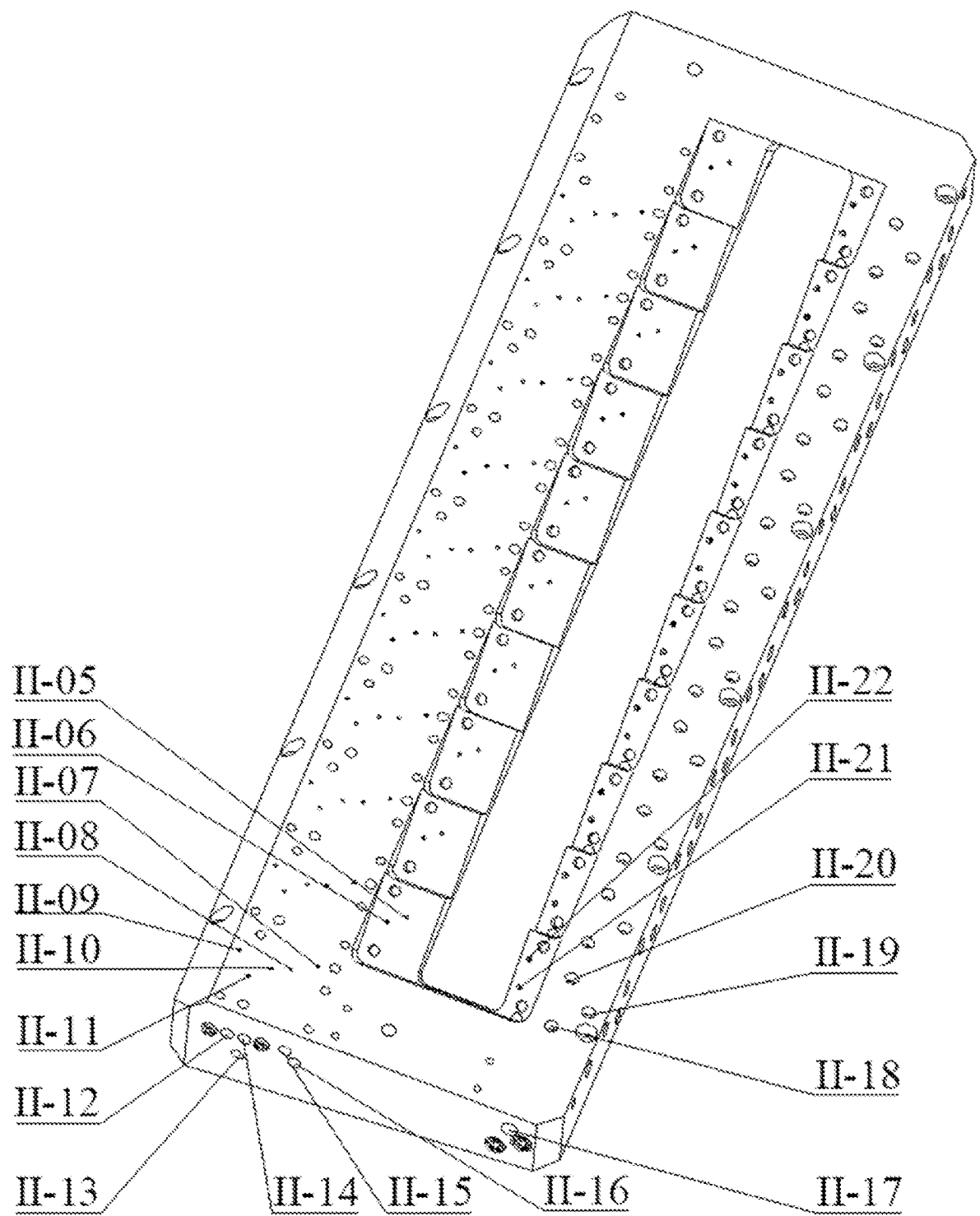
FIG. 4 is an axonometric view of a supporting plate mechanism.
Figure 5:
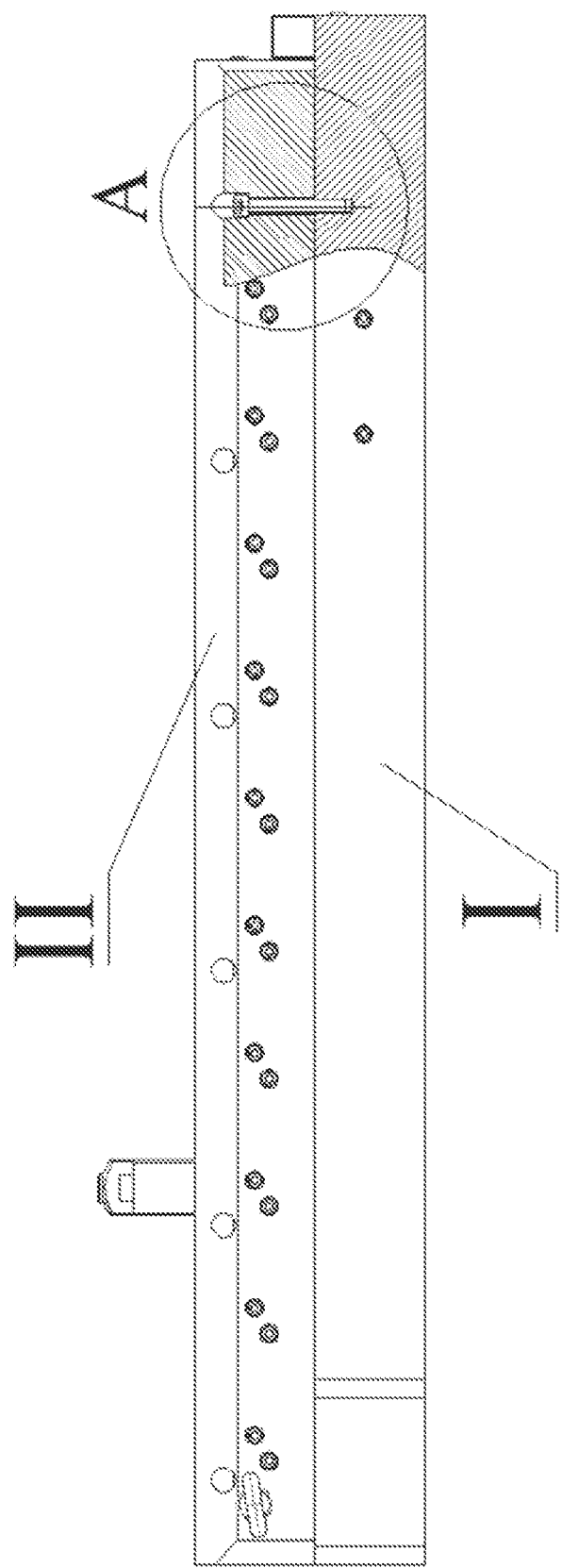
FIG. 5 is a partial cross-sectional view of a connecting portion between a lower bottom plate and a supporting plate.

As shown in FIG. 3 and FIG. 4, the supporting plate mechanism is internally provided with a hydraulic pipeline and an air-detection pipeline, the main functions of the supporting plate mechanism are as follows: supporting the positioning mechanism and the upper clamping mechanism, and transmitting hydraulic fluid and air, while the air-detection pipeline in the supporting plate mechanism is used for transmitting air to the positioning mechanism and the upper clamping mechanism. The supporting plate mechanism is provided with a plurality of stations, and each station is correspondingly provided with a positioning mechanism, an upper clamping mechanism, and an end face clamping mechanism.

Figure 6:
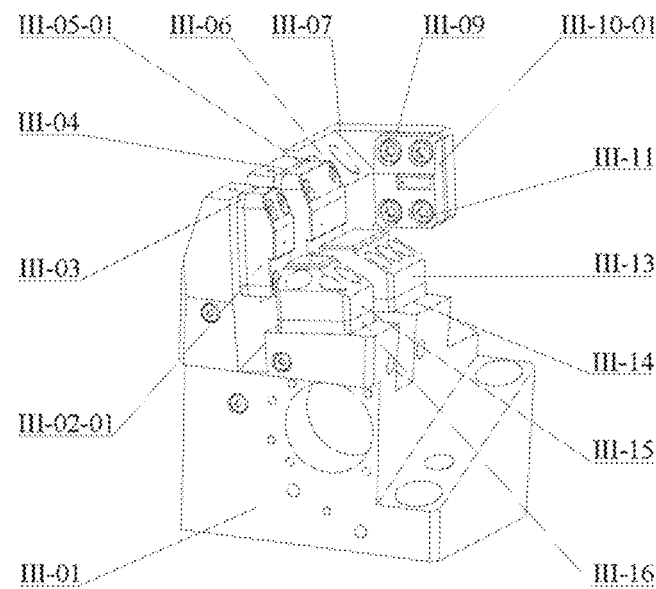
FIG. 6 is an axonometric view of a positioning mechanism.
Figure 7:
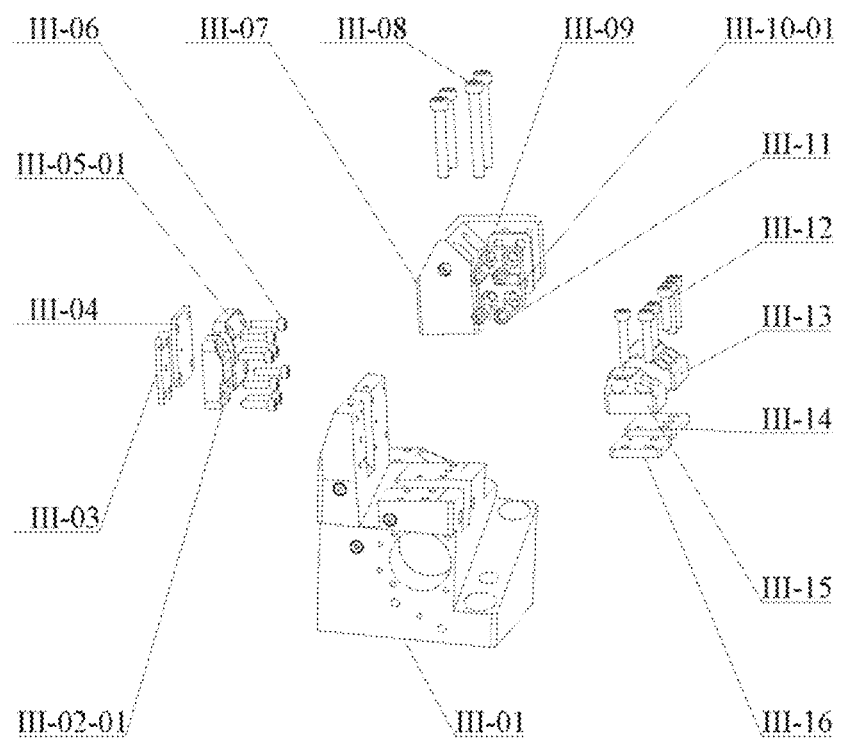
FIG. 7 is an exploded view of a positioning mechanism.
Figure 13:
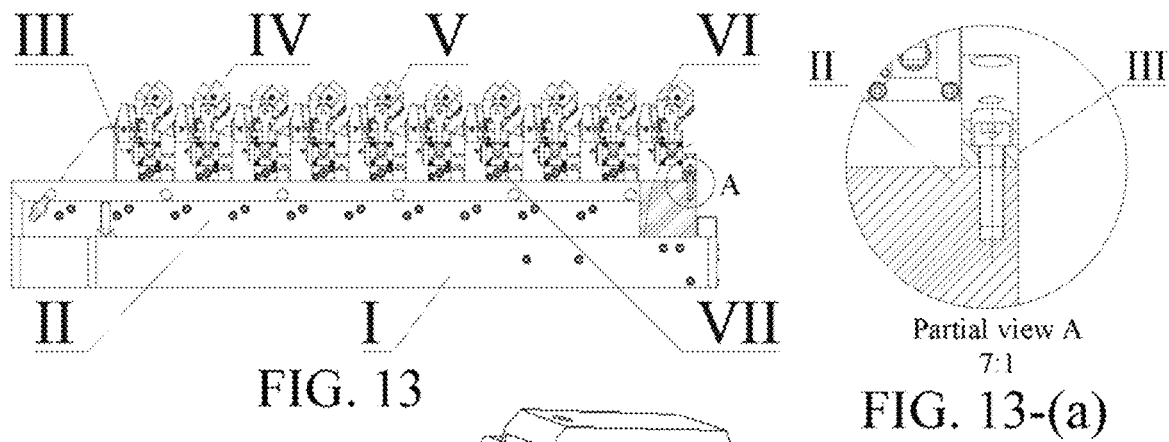
FIG. 13 is a front view of a multi-station turning tool bit milling fixture system capable of intelligently detecting a clamping force.
Figure 14:
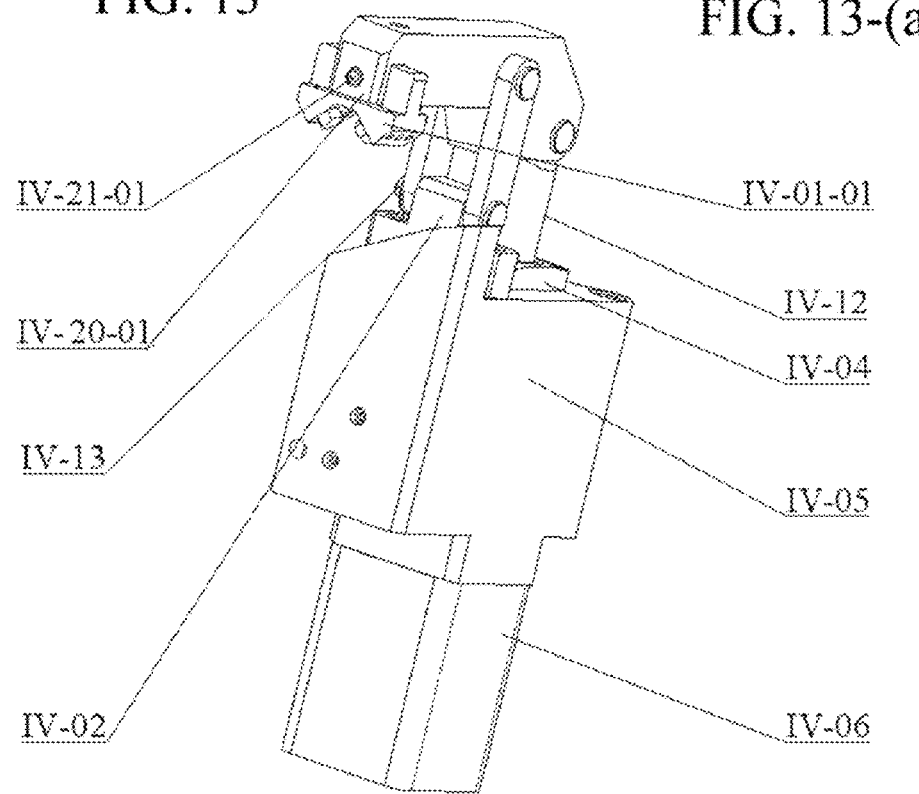
FIG. 14 is an axonometric view of an upper clamping mechanism.

With reference to FIG. 6, in the positioning mechanism shown in FIG. 7-(*a*) to FIG. 7-(*f*), a supporting gasket 1 III-03, a supporting block 1 III-02-01 (a supporting block 2 III-02-02 is adopted in Embodiment 2), and a positioning substrate III-01 are connected by hexagon socket head cap screws. A supporting gasket 2 III-04, a supporting block 3 III-05-01 (a supporting block 4 III-05-02 is adopted in Embodiment 2), and the positioning substrate III-01 are connected by hexagon socket head cap screws. A connecting block III-07 and the positioning substrate III-01 are connected by a hexagon socket head cap screw. The connecting block III-07, a supporting gasket 3 III-09, and a supporting block 5 III-10-01 (a supporting block 6 III-10-02 is adopted in Embodiment 2) are connected by hexagon socket head cap screws. A supporting block 7 III-13, a supporting gasket 4 III-14, and the positioning substrate III-01 are connected by hexagon socket head cap screws. A supporting block 8 III-15, a supporting gasket 5 III-16, and the positioning substrate III-01 are connected by hexagon socket head cap screws. The positioning substrate is secured to the supporting plate mechanism by using a hexagon socket head cap screw. The supporting block 1 III-02-01 and the supporting block 3 III-05-01 are side supporting blocks, the supporting block 7 III-13 and the supporting block 8 III-15 are bottom supporting blocks, and the supporting block 5 III-10-01 is a rear supporting block. When the workpiece is positioned, a six-point positioning principle is implemented by the supporting blocks by limiting the degree of freedom of the workpiece, to meet the positioning requirement of the workpiece during machining. When the specification of a workpiece to be clamped changes, workpieces with different specifications need to be positioned by changing the specification of the rear supporting block. The positioning substrate is internally provided with a workpiece main positioning face airtight detection pipeline and a workpiece main end face airtight detection pipeline, both the workpiece main positioning face airtight detection pipeline and the workpiece main end face airtight detection pipeline are communicated with the air-detection pipeline in the supporting plate mechanism, and the workpiece main positioning face airtight detection pipeline is communicated with the bottom supporting block and the side supporting block, while the workpiece main end face airtight detection pipeline is communicated with the rear supporting block, and whether the positioning of the workpiece meets the machining requirements can be detected by detecting the pressure of the air-detection pipeline.

In the upper clamping mechanism shown with reference to FIG. 14 to FIG. 21, the upper clamping mechanism is connected to the supporting plate mechanism at a position of a zigzag groove of the supporting plate mechanism by using a hexagon socket head cap screw. A piston ejector rod IV-08 is assembled in an upper clamping hydraulic cylinder body IV-06. A hydraulic cylinder sealing cover IV-09 passes through the piston ejector rod IV-08 and is screwed with the upper clamping hydraulic cylinder body IV-06. The upper clamping hydraulic cylinder body IV-06 and an air-detection shell IV-05 of the upper clamping mechanism are connected by a hexagon socket head cap screw IV-07. An air-detection sleeve IV-10 is embedded into the air-detection shell IV-05 of the upper clamping mechanism from below, and a sleeve IV-12 passes through a sealing cover IV-04 of the air-detection shell of the upper clamping mechanism and is embedded into the air-detection shell IV-05 of the upper clamping mechanism from above. An ejector rod mechanism IV-13 and a gasket IV-03 are assembled into the sleeve IV-12 from above. The sealing cover IV-04 of the air-detection shell of the upper clamping mechanism is connected to the air-detection shell IV-05 of the upper clamping mechanism by using a hexagon socket head cap screw IV-11. A pin seat IV-02 is connected to the air-detection shell IV-05 of the upper clamping mechanism by using a hexagon socket head cap screw IV-18. A pin shaft IV-14 sequentially passes through pin holes 1 IV-1501 of the connecting rod below the connecting rods at two sides and a pin shaft hole IV-0202 of the pin seat on the pin seat IV-02 to connect the pin seat with the connecting rods. Meanwhile, a gasket IV-17 is sleeved over the pin shaft IV-14 and a B-type pin IV-16 is inserted into a pin hole IV-1401 on the pin shaft IV-14 to position the pin shaft IV-14. An upper clamping big arm 1 IV-20-01 (an upper clamping big arm 2 IV-20-02 is adopted in Embodiment 2) and a connecting rod IV-15 are connected by a pin shaft passing through pin holes 2 IV-1502 of the connecting rod above the connecting rods at two sides and a pin shaft hole 1 IV-20-0103 (a pin shaft hole 2 IV-20-0203 on the upper clamping big arm 2) on the upper clamping big arm 1. The upper clamping big arm 1 IV-20-01 (the upper clamping big arm 2 IV-20-02) and the ejector rod mechanism IV-13 are connected by a pin shaft passing through a pin shaft hole 3 IV-20-0104 (a pin shaft hole 2 IV-20-0204 on the upper clamping big arm 2) on the upper clamping big arm 1 and a pin shaft hole above the ejector rod mechanism. A B-type pin passes through a positioning hole on the pin shaft to position the pin shaft. A positioning pin shaft IV-21-01 of a V-shaped clamping block 1 passes through a pin shaft hole IV-20-0101 on the upper clamping big arm 1 and a positioning hole IV-01-0101 of the V-shaped clamping block 1 to enter the inside of the big arm. The positioning between the upper clamping big arm 1 IV-20-01 and the V-shaped clamping block 1 IV-01-01 is implemented through an engagement relationship between a positioning screw IV-19 and a positioning hole IV-21-0101 of the positioning pin shaft of the V-shaped clamping block 1 (in Embodiment 2, a shaft pin type sensor IV-21-02 passes through a sensor hole IV-20-0201 of the upper clamping big arm 2 and a positioning hole IV-01-0201 of a V-shaped clamping block 2 to enter the inside of the big arm, and the positioning between the upper clamping big arm 2 IV-20-02 and the V-shaped clamping block 2 IV-01-02 is implemented through an engagement relationship between a positioning screw IV-22 and a sensor positioning screw hole IV-20-0202 of the upper clamping big arm 2). The V-shaped clamping block 1 and the V-shaped clamping block 2 are provided with V-shaped openings, and the V-shaped openings are arranged downwards.

Under the action of the fluid pressure, the upper clamping big arm 1 (the upper clamping big arm 2) drives the V-shaped clamping block 1 (the V-shaped clamping block 2) to clamp the workpiece. When the system of Embodiment 1 is used, and if the specification of a workpiece to be machined changes, cutter workpieces with different specifications need to be clamped by changing the specification of the V-shaped clamping block 1. When the upper clamping mechanism is in an open or clamping state, a computer may determine a current working state of the fixture by identifying the air pressure of the air-detection pipeline in the upper clamping mechanism. (When a system of Embodiment 2 is used, the computer analyzes a pressure signal transmitted by the shaft pin type sensor embedded in the upper clamping big arm 2 to identify the working state of the fixture.)

Figure 25:
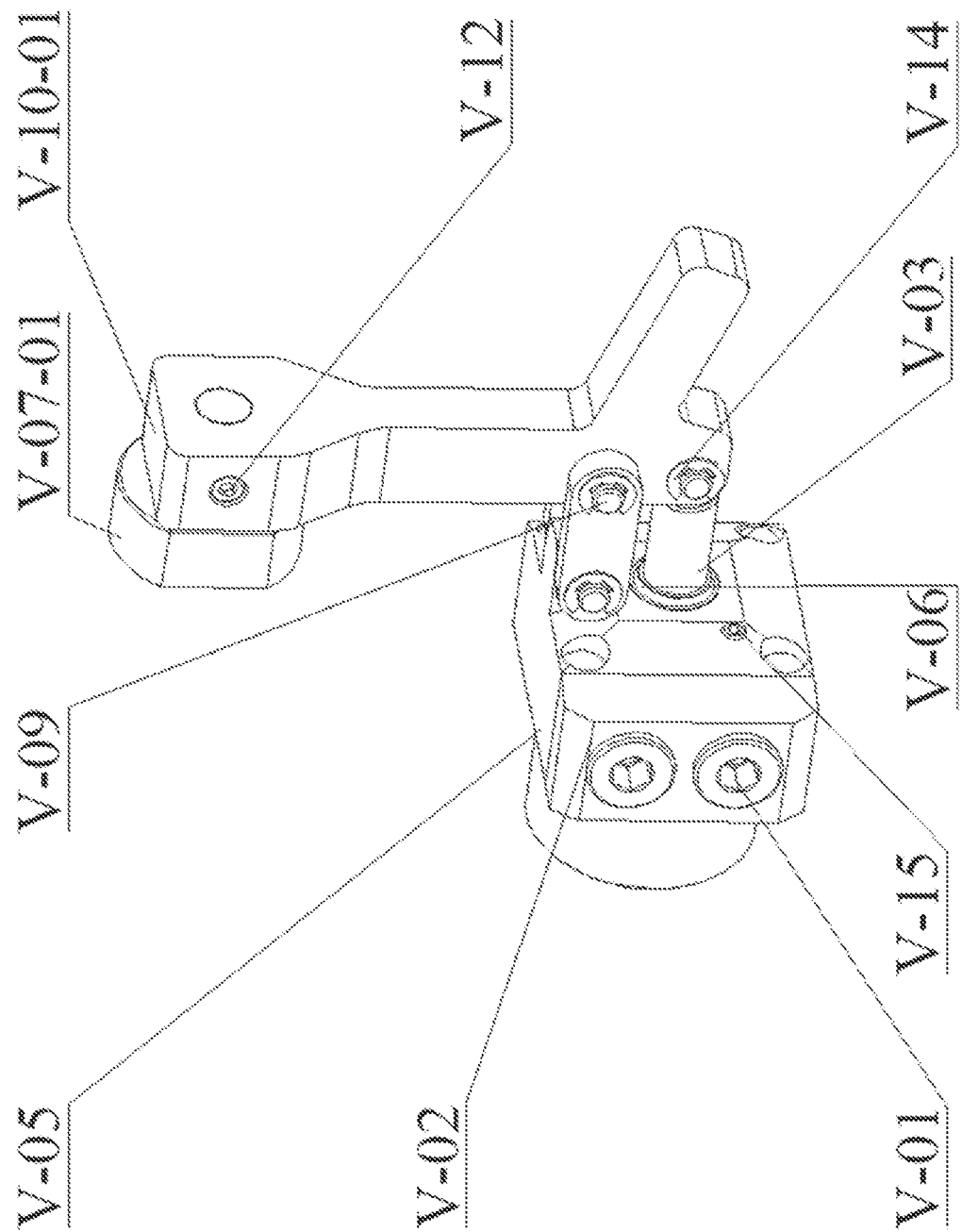
FIG. 25 is an axonometric view of an end face clamping mechanism.

In the end face clamping mechanism shown in FIG. 25 and FIG. 26, the end face clamping mechanism is connected to the positioning substrate by using a hexagon socket head cap screw, and a sealing platen V-02 and an end face hydraulic cylinder body V-05 are tightly engaged by using a sealing screw V-01 to prevent the leakage of the hydraulic fluid. A piston ejector rod V-03 passes through a hydraulic cylinder sealing cover V-06, and an end face clamping big arm 1 V-10-01 (an end face clamping big arm 2 V-10-02 is adopted in Embodiment 2) is engaged with the piston ejector pin V-03 through a pin shaft. A connecting rod V-13 and a connecting rod V-08 connect the end face clamping big arm 1 V-10-01 (the end face clamping big arm 2 V-10-02) to the hydraulic cylinder body V-05 by using pin shafts. A positioning clamp spring V-14 prevents the pin shafts from loosening to damage the engagement relationship during engagement. An end face clamping block 1 V-07-01 is secured to the end face clamping big arm 1 V-10-01 through a positioning screw V-12 (an end face clamping block 2 V-07-02 is adopted in Embodiment 2, and the end face clamping block 2 V-07-02 is secured to the end face clamping big arm 2 V-10-02 through a hexagon socket head cap screw V-16).

When the hydraulic fluid is output from a fluid outlet hole on the supporting plate mechanism and then enters the end face clamping hydraulic cylinder, under the action of the fluid pressure, the end face clamping big arm 1 (the end face clamping big arm 2) drives the end face clamping block 1 (the end face clamping block 2) to clamp or loosen the workpiece.

With reference to an end face clamping air-detection mechanism shown in FIG. 28, an air-detection pin VII-03 passes through a sleeve VII-04 and an upper shell VII-05 of an end face clamping air-detection device and protrudes from the upper shell. A return spring VII-02 is assembled between a lower shell VII-01 of the end face clamping air-detection device and the air-detection pin VII-03, and the return spring is used for determining a position of the air-detection pin. The lower shell VII-01 of the end face clamping air-detection device and the upper shell VII-05 of the end face clamping air-detection device are connected by a hexagon socket head cap screw.

A function of controlling the air inlet and outlet is implemented through the mutual engagement between the sleeve and the air-detection pin, and the requirement for controlling the air pressure change in the air-detection pipeline is implemented. The computer identifies the working state of the fixture by analyzing the air pressure of the air-detection pipeline in the fixture system. (When the system of Embodiment 2 is used to clamp the end face, the end face clamping air-detection device is replaced with a micro pressure sensor in the end face clamping block 2, and the computer can identify the working state of the fixture by analyzing a pressure signal transmitted by the sensor.)

A specific working process of Embodiment 1 is as follows:

As shown in FIG. 6, FIG. 7-(*a*), FIG. 7-(*b*), FIG. 7-(*e*), and FIG. 7-(*f*), the fixture system first needs to accurately position a workpiece VIII before clamping the workpiece.

When the workpiece is positioned on the positioning mechanism III in Embodiment 1, the supporting block 7 III-13 and the supporting block 8 III-15 can limit three degrees of freedom of the workpiece for rotation along an X axis, rotation along a Y axis and movement along a Z axis. The supporting block 1 III-02-01 and the supporting block 3 III-05-01 can limit three degrees of freedom of the workpiece for movement along the X axis, rotation along the Z axis, and rotation along the Y axis. The supporting block 5 III-10-01 can limit two degrees of freedom of the workpiece for movement along the Y axis and rotation along the Z axis, so that the positioning mechanism can completely limit the six degrees of freedom of the workpiece. When the specification of the workpiece III to be machined changes, workpieces with different specifications may be positioned by changing the specification of the supporting block 5 III-10-01.

When the workpiece is positioned, the hydraulic fluid is input from a fluid inlet hole 3 I-07 on the lower bottom plate mechanism I, then passes through a fluid outlet hole 4 I-10 of the end face clamping hydraulic cylinder on the lower bottom plate mechanism I, a fluid inlet hole 5 II-01 on the supporting plate mechanism II, a fluid outlet hole 6 II-09 on the supporting plate mechanism II, a fluid inlet hole 11 III-0105 on the positioning substrate III-01, and a fluid outlet hole 13 III-0107 on the positioning substrate III-01 in sequence, and finally enters the end face clamping hydraulic cylinder from a fluid inlet hole 16 V-0201. Under the action of the fluid pressure, the end face clamping big arm 1 V-10-01 drives the end face clamping block 1 V-07-01 to clamp the workpiece VIII. The end face clamping mechanism V and the positioning mechanism III are engaged to implement clamping of the workpiece VIII in an end face direction. Meanwhile, the hydraulic fluid is input from a fluid inlet hole 1 I-05 on the lower bottom plate mechanism I, sequentially passes through a fluid outlet hole 2 I-04 on the lower bottom plate mechanism I, a fluid inlet hole 7 II-03 on the supporting plate mechanism II, a fluid outlet hole 6 II-09 on the supporting plate mechanism II, a fluid inlet hole 12 IV-0505 on the air-detection shell IV-05 of the upper clamping mechanism, a fluid outlet hole 15 IV-0504 on the air-detection shell IV-05 of the upper clamping mechanism, and is finally input into the hydraulic cylinder through a fluid inlet hole 15 IV-0602 on the upper clamping hydraulic cylinder body IV-06. Under the drive of the fluid pressure, the upper clamping big arm 1 IV-20-01 drives the V-shaped clamping block 1 IV-01-01 to clamp the workpiece VIII in upper and side directions. The workpiece VIII may be positioned and clamped in the upper and side directions under the interaction between the upper clamping mechanism and the positioning mechanism III. When the specification of the workpiece III to be clamped changes, workpieces with different specifications may be clamped by changing a model of the V-shaped clamping block 1 IV-01-01.

The workpiece may be completely positioned and clamped during machining through the mutual engagement between the above two clamping mechanisms and the positioning mechanism III.

As shown in FIG. 29, after the positioning and clamping procedure is completed, in order to detect whether the positioning and clamping of the workpiece VIII meets the requirements, a detection device in the fixture system needs to be used to detect the positioning and clamping state of the workpiece. After the fixture system clamps the workpiece VIII, there is no contact and compression between the end face clamping big arm 1V-10-01 and the end face clamping air-detection mechanism VII. An air pump inputs air from an air inlet hole 1 II-12 on the supporting plate mechanism II, and then the air sequentially passes through an air outlet hole 5 II-11 on the supporting plate mechanism II, an air inlet hole 8 III-0104 on the positioning substrate III-01, and an air outlet hole 6 III-0108 on the positioning substrate III-01, and is finally input into the end face clamping air-detection mechanism VII through an air inlet hole 14 VII-0101 on the lower shell VII-01 of the end face clamping air-detection device. During clamping, there is no contact and compression between the end face clamping big arm 1 V-10-01 and the end face clamping air-detection mechanism. In this case, the air leaks through an air outlet hole 17 VII-0501, and an air manometer of the system feeds back an air pressure signal to the computer that controls the automatic production line, and the computer identifies and determines the working state of the fixture.

Both an upper side portion and a lower side portion of the air-detection sleeve are provided with air inlet holes. The two air inlet holes are arranged at 90 degrees. The air-detection sleeve is provided with two air outlet holes between the two air inlet holes. The two air outlet holes are provided opposite to one of the air inlet holes. Both the two air inlet holes are communicated with the air-detection pipeline. A bottom portion of the ejector rod mechanism is connected to the air-detection sleeve and the bottom portion of the ejector rod mechanism is provided with an air blocking ring. When the upper clamping mechanism loosens the workpiece, the ejector rod mechanism moves down the air blocking ring to block the air inlet hole at the lower side portion, and when the upper clamping mechanism clamps the workpiece, the ejector rod mechanism moves up the air blocking ring to block the air inlet hole at the upper side portion. A specific process is as follows.

Figure 23:
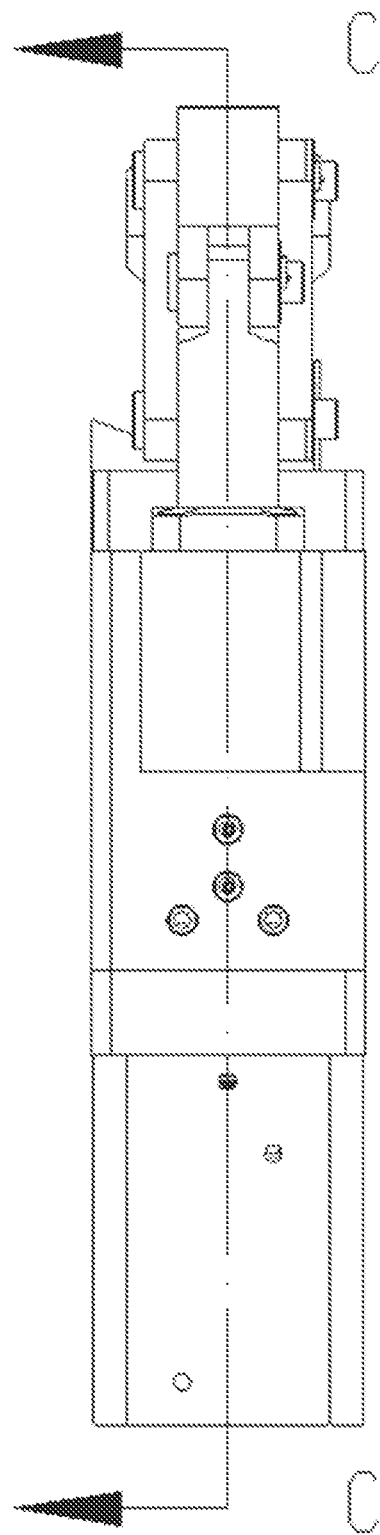
FIG. 23 is a side view of the upper clamping mechanism in a clamping state.
Figure 23I:
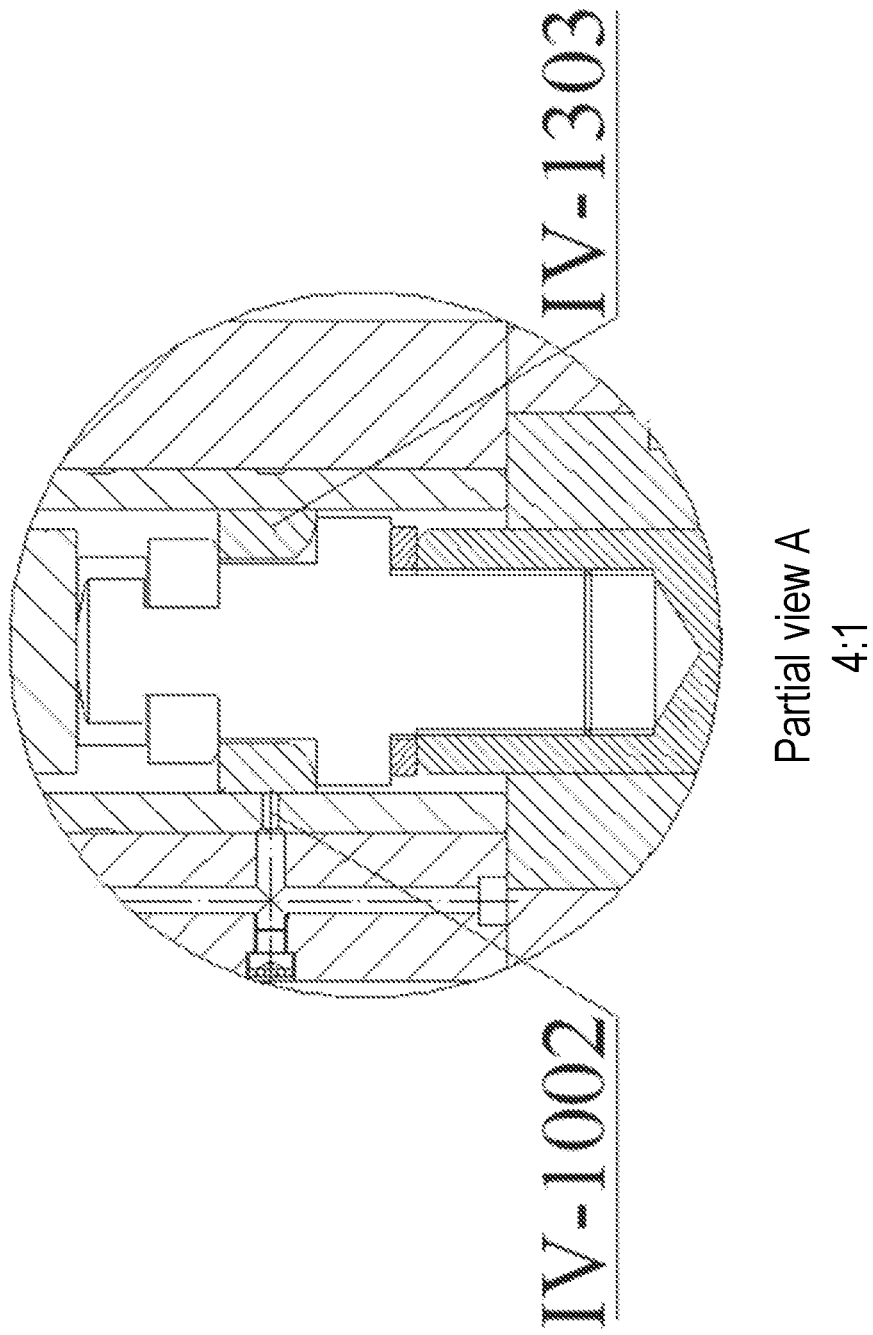
Figure 24:
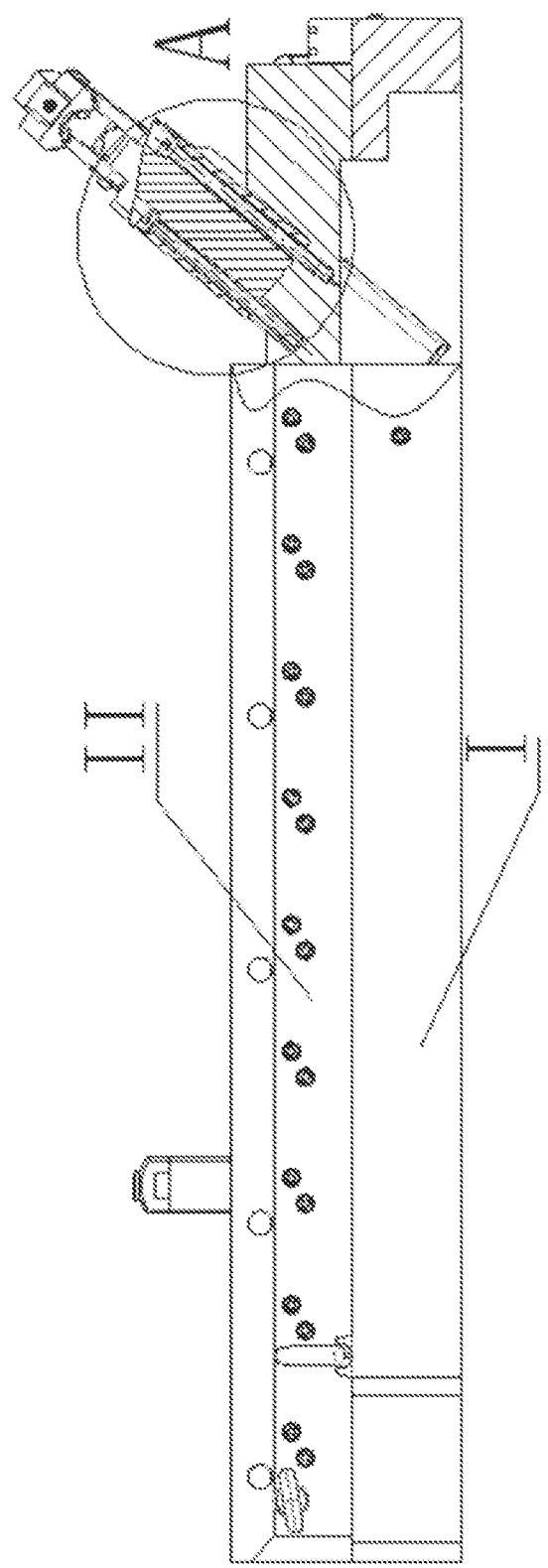
FIG. 24 is a partial sectional view of a connecting portion between the upper clamping mechanism and the supporting plate mechanism.

As shown in FIG. 23, after the air pump inputs the air from an air inlet hole 5 II-16 on the supporting plate mechanism II, the air sequentially passes through an air outlet hole 2 II-06 on the supporting plate mechanism and an air inlet hole 10 IV-0501 on the air-detection shell, and finally enters the inside of the shell through an air inlet hole 12 IV-1001 on the air-detection sleeve IV-10 of the upper clamping mechanism. When the upper clamping mechanism is in a loosening state, the air input from the air inlet hole 10 IV-0501 is blocked by the air blocking ring IV-1302 and cannot be discharged from an air outlet hole 13 IV-0507 and an air outlet hole 14 IV-0508 through an air outlet hole 15 IV-1003 and an air outlet hole 16 IV-1004, the air manometer in the system feeds back an air pressure signal to the computer that controls the automatic production line, and the computer identifies and determines the working state of the fixture.

As shown in FIG. 23, after the air pump inputs the air from an air inlet hole 2 II-13 on the supporting plate mechanism II, the air sequentially passes through an air outlet hole 1 II-05 on the supporting plate mechanism and an air inlet hole 11 IV-0502 on the air-detection shell, and finally enters the inside of the shell through an air inlet hole 13 IV-1002 on the air-detection sleeve IV-10 of the upper clamping mechanism. When the upper clamping mechanism is in a clamping state, the air input from the air inlet hole 13 IV-1002 is directly discharged from the air outlet hole 13 IV-0507 and the air outlet hole 14 IV-0508 through the air outlet hole 15 IV-1003 and the air outlet hole 16 IV-1004, the air manometer in the system feeds back an air pressure signal to the computer that controls the automatic production line, and the computer identifies and determines the working state of the fixture.

As shown in FIG. 8, FIG. 9, FIG. 11, and FIG. 12, the air pump inputs the air from an air inlet hole 3 II-14 on the supporting plate mechanism II, the air sequentially passes through an air outlet hole 4 II-10 on the supporting plate mechanism II, an air inlet hole 7 III-0103 on the positioning substrate, as well as an air outlet hole 7 III-0109, an air outlet hole 8 III-0110, an air outlet hole 9 III-0111, an air outlet hole 10 III-0112, and an air outlet hole 11 III-0113 on the positioning substrate III-01, and is finally input into air pipelines of the supporting gasket and the bottom and side supporting blocks. When a main positioning surface of the workpiece is in a good positioning and clamping state, the air does not leak. When the main positioning surface of the workpiece is in a poor positioning and clamping state or the fixture is in an opening state, the air leaks. The air manometer of the system feeds back an air pressure change signal to the computer that controls the automatic production line, and the computer identifies and determines the working state of the fixture.

As shown in FIG. 10, the air pump inputs the air from an air inlet hole 4 II-15 on the supporting plate mechanism II, the air sequentially passes through an air outlet hole 3 II-07 on the supporting plate mechanism, an air inlet hole 9 III-0701 on the connecting block III-07, and an air outlet hole 12 III-0702 on the connecting block III-07, and is finally input into air pipelines of a supporting gasket 3 III-09 and the supporting block 5 III-10-01. When an end face of the workpiece is in a good positioning and clamping state, the air does not leak. When the end face of the workpiece is in a poor positioning and clamping state or the fixture is in an opening state, the air leaks. The air manometer of the system feeds back an air pressure change signal to the computer that controls the automatic production line, and the computer identifies and determines the working state of the fixture.

When the machine tool finishes machining the workpiece VIII, the fixture system releases the clamping of the workpiece VIII. In this case, the hydraulic fluid is input from a fluid inlet hole 4 I-08 on the lower bottom plate mechanism I, then sequentially passes through a fluid outlet hole 3 I-09 of the end face clamping hydraulic cylinder on the lower bottom plate mechanism I, a fluid inlet hole 6 II-02 on the supporting plate mechanism II, and a fluid outlet hole 5 II-08 on the supporting plate mechanism, and finally enters the end face hydraulic cylinder body V-05 from the fluid inlet hole 16 V-0201. Under the action of the fluid pressure, the end face clamping big arm 1 V-10-01 drives the end face clamping block 1 V-07-01 to release the clamping of the end face of the workpiece.

The hydraulic fluid is input from a fluid inlet hole 2 I-06 on the lower bottom plate mechanism I, then sequentially passes through a fluid outlet hole 1 I-03 on the lower bottom plate mechanism I, a fluid inlet hole 8 II-04 on the supporting plate mechanism II, a fluid outlet hole 11 II-22 on the supporting plate mechanism II, a fluid inlet hole 13 IV-0506 on the air-detection shell IV-05 of the upper clamping mechanism, and a fluid outlet hole 14 IV-0503 on the air-detection shell IV-05 of the upper clamping mechanism, and finally enters the hydraulic cylinder from a fluid inlet hole 14 IV-0601 of the upper compression hydraulic cylinder body. Under the action of the fluid pressure, the upper clamping big arm 1 IV-20-01 drives the V-shaped clamping block 1 IV-01-01 to release the upper and side clamping of the workpiece VIII.

As shown in FIG. 30, when the fixture is in a loosening state, the air pump inputs the air into the end face clamping air-detection mechanism VII from the air inlet hole 1 II-12 on the supporting plate mechanism II in the same route as in Embodiment 1. When the fixture is opened, there is contact and compression between the end face clamping big arm 1 V-10-01 and the air-detection pin VII-03 of the end face clamping air-detection mechanism. The return spring VII-02 is compressed. In this case, the air does not leak through the air outlet hole 17 VII-0501 on the upper shell VII-05 of the end face clamping air-detection device, then the air manometer of the system feeds back an air pressure signal to the computer that controls the automatic production line, and the computer identifies and determines the working state of the fixture.

As shown in FIG. 28, when the fixture is in a loosening state, the air pump inputs the air into the air-detection shell IV-05 of the upper clamping mechanism from the air inlet hole 5 II-16 on the supporting plate mechanism II in the same route as in Embodiment 1. When the upper clamping mechanism is in a loosening state, the air input from the air inlet hole 10 IV-0501 on the air-detection shell IV-05 of the upper clamping mechanism is not blocked by the air blocking ring IV-1302 and is smoothly discharged out of the system through the air outlet hole 13 IV-0507 or the air outlet hole 14 IV-0508, the air manometer in the system feeds back an air pressure signal to the computer that controls the automatic production line, and the computer identifies and determines the working state of the fixture.

As shown in FIG. 28, when the fixture is in a loosening state, the air pump inputs the air into the air-detection shell IV-05 of the upper clamping mechanism from the air inlet hole 2 II-13 on the supporting plate mechanism II in the same route as in Embodiment 1. When the upper clamping mechanism is in an opening state, the air input from the air inlet hole 13 IV-1002 on the air-detection sleeve IV-10 of the upper clamping mechanism is blocked by the air blocking ring IV-1302. The air cannot be discharged out of the system through the air outlet hole 13 IV-0507 or the air outlet hole 14 IV-0508 on the air-detection shell IV-05 of the upper clamping mechanism, the air manometer of the system feeds back an air pressure signal to the computer that controls the automatic production line, and the computer identifies and determines the working state of the fixture.

A specific working process of Embodiment 2 is as follows:

When the system of Embodiment 2 is used, all the air-detection systems in Embodiment 1 are replaced with the sensor in Embodiment 2. The V-shaped clamping block 2, the end face clamping block 2, the end face clamping big arm 2, and the upper clamping big arm 2 in Embodiment 2 are the same as the V-shaped clamping block 1, the end face clamping block 1, the end face clamping big arm 1, and the upper clamping big arm 1 in Embodiment 1 respectively, except that the air-detection part is replaced with the sensor.

As shown in FIG. 7-(c) and FIG. 7-(d), the fixture system needs to first accurately position the workpiece before clamping the workpiece VIII. When the workpiece is positioned on a positioning system in Embodiment 2, the supporting block 7 III-13 and the supporting block 8 III-15 may limit three degrees of freedom of the workpiece for rotation along an X axis, rotation along a Y axis, and movement along a Z axis. A supporting block 2 III-02-02 and a supporting block 4 III-05-02 may limit two degrees of freedom of the workpiece for movement along the X axis and rotation along the Z axis. The supporting block 6 III-10-02 may limit one degree of freedom of the workpiece for movement along the Y axis. The positioning mechanism may completely limit the six degrees of freedom of the workpiece. When the specification of the workpiece VIII to be machined changes, workpieces with different specifications may be positioned by changing the specification of the supporting block 6 III-10-02.

There is no difference between the direction of the hydraulic fluid when the end face clamping mechanism V clamps the workpiece and the direction in Embodiment 1, and details are not described herein again. Under the action of the fluid pressure, the end face clamping big arm 2 V-10-02 drives the end face clamping block 2 V-07-02 to apply a clamping force to an end face of the workpiece. The end face clamping mechanism V is engaged with the positioning mechanism III to position and clamp the workpiece VIII in the end face direction. When the end face clamping block 2 clamps the workpiece, the workpiece has a reaction force on the end face clamping block 2, and the reaction force is transmitted to the micro pressure sensor V-07-0202 of the end face clamping block 2 V-07-02. The micro pressure sensor captures data and sends the data to the computer to identify and determine the working state of the fixture.

There is no difference between the direction of the hydraulic fluid when the upper clamping mechanism clamps the workpiece and the direction in Embodiment 1, and details are not described herein again. Under the action of the fluid pressure, the upper clamping big arm 2 IV-20-02 drives the V-shaped clamping block 2 IV-01-02 to clamp the workpiece VIII. When the V-shaped clamping block 2 IV-01-02 applies a clamping force to the workpiece VIII, the workpiece also generates a reaction force to the V-shaped clamping block 2 and the force is also transmitted to the shaft pin type sensor IV-21-02. In this case, the data collected by the sensor is transmitted to the computer that controls the automatic production line, and the computer identifies and determines the working state of the fixture. When the specification of a cutter to be clamped is 16×16 mm, a piston in an upper clamping piston cylinder does not reach a top dead center of the piston cylinder, and when the specification of the cutter to be clamped is 25×25 mm, the position of the piston does not reach a lower dead center. Therefore, when the system of Embodiment 2 is used, and when the specification of the cutter workpiece VIII to be clamped changes, the workpiece may be clamped stably without changing the specification of the V-shaped clamping block 2 IV-01-02.

When the machine tool finishes machining the workpiece VIII, the fixture system releases the clamping of the workpiece VIII.

There is no difference between the direction of the hydraulic fluid when the end face clamping mechanism V loosens the workpiece and the direction in Embodiment 1, and details are not described herein again. Under the action of the fluid pressure, the end face clamping big arm 2 V-10-02 drives the end face clamping block 2 V-07-02 to release the clamping of the workpiece.

There is no difference between the direction of the hydraulic fluid when the upper clamping mechanism loosens the workpiece and the direction in Embodiment 1, and details are not described herein again. Under the action of the fluid pressure, the upper clamping big arm 2 IV-20-02 drives the V-shaped clamping block 2 IV-01-02 to release the clamping of the workpiece VIII.

When the fixture is in an opening state, neither the end face clamping mechanism nor the upper clamping mechanism applies a clamping force to the workpiece, and the shaft pin type sensor IV-21-02 and the micro pressure sensor V-07-0202 are not subject to a reaction force. In this case, the data collected by the sensor is transmitted to the computer that controls the automatic production line, and the computer identifies and determines the working state of the fixture.

An exponential formula of a cutting force is obtained through a large number of experiments, after the cutting force is measured by a dynamometer, the obtained data is processed by a mathematical method, and an empirical formula for calculating the cutting force may be obtained.

According to an empirical formula for milling force calculation: F is a milling force, $C_P$ is a type coefficient of a milling cutter, $a_p$ is a milling depth, $f_z$ is a feed per tooth, d is a diameter of the milling cutter, B is a milling width, Z is a number of teeth of the milling cutter, and $K_p$ is a coefficient of correction;

$$F = C_p a_p^{0.86} f_z^{0.72} d^{-0.86} B \cdot z K_p \quad (1)$$

After a hydraulic pump delivers the hydraulic fluid to the upper clamping hydraulic cylinder through the hydraulic pipeline in the system, the hydraulic fluid exerts the pressure on a bottom face of the piston ejector rod, and an effective contact area between the bottom face and the hydraulic fluid is S. Under the action of pressure, the upper clamping big arm clamps the workpiece. $F_1$ is the force exerted by the ejector rod mechanism IV-13 on the upper clamping big arm. $L_1$ is a horizontal linear distance between a pin shaft hole 3 IV-20-0104 of the upper clamping big arm 1 and a pin shaft hole 2 IV-20-0103 of the upper clamping big arm 1, $L_2$ is a horizontal linear distance between a pin hole 2 IV-20-0103 of the upper clamping big arm 1 and a positioning hole IV-01-0101 of the V-shaped clamping block 1, and $F_2$ is the clamping force exerted by the V-shaped clamping block on the workpiece. Then, according to an equation of static equilibrium, $$\Sigma M = 0 F_1 L_1 = F_2 L_2 \quad (2)$$

It may be derived that $$F_1 = F_2 L_2 / L_1 \quad (3)$$

During clamping, a component force $F_1'$ and a component force $F_2'$ exerted by the V-shaped clamping block on the upper part and the side part of the workpiece are as follows:

$$F_1' = F_2' = F_2 \cos 45° \quad (4)$$

When the above analysis is performed in a clamping critical state during workpiece processing, $$F = F_1' = F_2' = F_2 \cos 45° \quad (5)$$

$$C_p a_p^{0.086} f_z^{0.72} d^{-0.86} B \cdot z K_p = F_2 \cos 45° \quad (6)$$

Therefore $$F_2 = C_p a_p^{0.086} f_z^{0.72} d^{-0.86} B \cdot z K_p / \cos 45° \quad (7)$$

It may be obtained by substituting $F_2$ into the formula (3) that:

$$F_1 = F_2 L_2 / L_1 = C_p a_p^{0.86} f_z^{0.72} d^{-0.86} B \cdot z K_p \cdot L_2 / L_1 \cdot \cos 45° \quad (8)$$

Therefore, the fluid pressure P needing to be provided by the hydraulic pump is at least:

$$P = F_1 \cdot S = C_p a_p^{0.86} f_z^{0.72} d^{-0.86} B \cdot z K_p \cdot L_2 \cdot S / L_1 \cdot \cos 45° \quad (9)$$

When the machine tool processes the workpiece, a cutting fluid is input from a fluid inlet hole 9 II-17 on the supporting plate mechanism II, and then delivered to a fluid nozzle of a cutting lubricating mechanism VI corresponding to each fluid outlet hole from a fluid outlet hole 7 II-18, a fluid outlet hole 8 II-19 and a fluid outlet hole 9 II-20 on the supporting plate mechanism II. The fluid nozzle conveys the cutting fluid to a cutting area through a fluid pipe for lubrication. Cutter wear can be reduced and machining accuracy can be improved.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

The above descriptions are merely preferred embodiments of this application and are not intended to limit this application. For those skilled in the art, this application may have various modifications and changes. Any modification, equivalent replacement, or improvement made without departing from the spirit and principle of this application shall fall within the protection scope of this application.

What is claimed is:

1. A multi-station turning tool bit milling fixture system, comprising a lower bottom plate mechanism, a supporting plate mechanism, a positioning mechanism, an upper clamping mechanism, an end face clamping mechanism, and an end face clamping air-detection mechanism, wherein:
   the lower bottom plate mechanism comprises a substrate of a lower bottom plate, and a first hydraulic pipeline is arranged in the substrate of the lower bottom plate for transmitting hydraulic fluid to an upper clamping hydraulic cylinder and an end face clamping hydraulic cylinder;
   the supporting plate mechanism is fixedly connected to the lower bottom plate mechanism, and the supporting plate mechanism is internally provided with an air-detection pipeline for transmitting air to the positioning mechanism and to the upper clamping mechanism;
   the positioning mechanism is fixedly connected to the supporting plate mechanism, the positioning mechanism comprises a positioning substrate, and a plurality of supporting blocks are fixedly arranged on the positioning substrate;
   wherein each of the plurality of the supporting blocks comprises a bottom supporting block, a side supporting block, and a rear supporting block, the bottom supporting block and the side supporting block are secured to the positioning substrate, the rear supporting block is secured to a connecting block, and the connecting block is L-shaped and connected to a side portion of the positioning substrate; and
   the plurality of supporting blocks, in conjunction with the upper clamping mechanism and the end face clamping mechanism, are configured for clamping a workpiece to implement six-point positioning of the workpiece;
   the upper clamping mechanism is fixedly connected to the supporting plate mechanism, the upper clamping mechanism comprises a V-shaped clamping block, the V-shaped clamping block is connected to an upper clamping big arm, the upper clamping big arm is connected to the upper clamping hydraulic cylinder through an ejector rod mechanism, and the upper clamping hydraulic cylinder works to drive the V-shaped clamping block through the upper clamping big arm to clamp the workpiece from above the workpiece;
   the end face clamping mechanism is fixedly connected to the positioning substrate, the end face clamping mechanism comprises an end face clamping block, the end face clamping block is connected to an end face clamping big arm, the end face clamping big arm is connected to the end face clamping hydraulic cylinder through a piston ejector rod, and the end face clamping hydraulic cylinder works to drive the end face clamping block through the end face clamping big arm to clamp the workpiece at a side face of the workpiece; and the end face clamping air-detection mechanism comprises an air pressure detection component, the air pressure detection component is connected to a controller, and the air pressure detection component is capable of detecting a pressure of the air-detection pipeline to identify working states of the positioning mechanism and the upper clamping mechanism;

wherein the air pressure detection component comprises a micro pressure sensor, and the micro pressure sensor is fixedly arranged at the end face clamping block; and the upper clamping big arm is also fixedly provided with a shaft pin type sensor; and wherein the air pressure detection component also comprises an upper shell and a lower shell which are oppositely arranged, an air-detection pin is arranged by passing through the upper shell from the lower shell, and the air-detection pin extends beyond the upper shell, a return spring is arranged in the upper shell to support the air-detection pin, an air outlet hole is provided in the upper shell, an air inlet hole is provided in the lower shell, and the air inlet hole is communicated with the air-detection pipeline; and an outer portion of the end face clamping big arm is fixedly connected to a fixing rod, and when the end face clamping mechanism loosens the workpiece, the end face clamping big arm turns over the fixing rod to contact with the air-detection pin.

2. The system according to claim 1, wherein the supporting plate mechanism is provided with a plurality of stations, each of the plurality of stations is correspondingly provided with a positioning mechanism, an upper clamping mechanism, and an end face clamping mechanism, and at each of the plurality of stations, a zigzag groove is provided at a top portion of the supporting plate mechanism to be engaged with and fixedly connected to the upper clamping mechanism of the corresponding station.

3. The system according to claim 1, wherein a second hydraulic pipeline is arranged in the supporting plate mechanism, the second hydraulic pipeline is communicated with the first hydraulic pipeline, and the second hydraulic pipeline is communicated with the upper clamping hydraulic cylinder and the end face clamping hydraulic cylinder to transmit hydraulic fluid to the upper clamping hydraulic cylinder and to the end face clamping hydraulic cylinder; and a cutting lubricating mechanism is also arranged on the supporting plate mechanism, the cutting lubricating mechanism is provided with a fluid nozzle, the fluid nozzle is communicated with a third hydraulic pipeline arranged in the supporting plate mechanism, and the fluid nozzle of the cutting lubricating mechanism is capable of spraying a cutting fluid to a cutting area for lubrication during cutting of the workpiece.

4. The system according to claim 1, wherein the positioning substrate is internally provided with a workpiece main positioning face airtight detection pipeline and a workpiece main end face airtight detection pipeline, both the workpiece main positioning face airtight detection pipeline and the workpiece main end face airtight detection pipeline are communicated with the air-detection pipeline, and the workpiece main positioning face airtight detection pipeline is communicated with the bottom supporting block and the side supporting block, while the workpiece main end face airtight detection pipeline is communicated with the rear supporting block, and whether a main positioning face and a main end face of the workpiece are positioned in place can be detected by detecting the pressure of the air-detection pipeline.

5. The system according to claim 1, wherein the upper clamping big arm is hinged with the ejector rod mechanism, the upper clamping big arm is also hinged with a connecting rod, and the connecting rod is secured to the upper clamping hydraulic cylinder; the V-shaped clamping block is provided with a V-shaped opening, and the V-shaped opening is arranged downwards; and the end face clamping big arm is hinged with the piston ejector rod, the end face clamping big arm is also hinged with the connecting rod, and the connecting rod is secured to the end face clamping hydraulic cylinder.

6. The system according to claim 1, wherein an air-detection shell of the upper clamping mechanism is fixedly arranged above the upper clamping hydraulic cylinder, an air-detection sleeve is embedded in the air-detection shell of the upper clamping mechanism, both an upper side portion and a lower side portion of the air-detection sleeve are provided with an air inlet hole, two of the air inlet holes are arranged at 90 degrees, the air-detection sleeve is provided with two air outlet holes between the two air inlet holes, the two air outlet holes are provided opposite to one of the two air inlet holes, and both the two air inlet holes are communicated with the air-detection pipeline.

7. The system according to claim 6, wherein a bottom portion of the ejector rod mechanism is connected to the air-detection sleeve, and an air blocking ring is arranged at the bottom portion of the ejector rod mechanism, when the upper clamping mechanism loosens the workpiece, the ejector rod mechanism moves down the air blocking ring to block the air inlet hole at the lower side portion, and when the upper clamping mechanism clamps the workpiece, the ejector rod mechanism moves up the air blocking ring to block the air inlet hole at the upper side portion.

* * * * *